United States Patent
Hu

(10) Patent No.: US 9,639,523 B2
(45) Date of Patent: May 2, 2017

(54) SYSTEM AND METHOD FOR PROCESSING NATURAL LANGUAGE

(71) Applicant: Shangfeng Hu, Endeavour Hills (AU)

(72) Inventor: Shangfeng Hu, Endeavour Hills (AU)

( * ) Notice: Subject to any disclaimer, the term of this patent is extended or adjusted under 35 U.S.C. 154(b) by 553 days.

(21) Appl. No.: 14/018,889

(22) Filed: Sep. 5, 2013

(65) Prior Publication Data
US 2015/0066477 A1    Mar. 5, 2015

(51) Int. Cl.
*G06F 17/27* (2006.01)

(52) U.S. Cl.
CPC ........ *G06F 17/2785* (2013.01); *G06F 17/271* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC .................................................. 704/1, 9, 10
See application file for complete search history.

(56) References Cited

U.S. PATENT DOCUMENTS

| | | | | |
|---|---|---|---|---|
| 2002/0049692 | A1* | 4/2002 | Venkatram | G06F 17/3089 706/59 |
| 2002/0194154 | A1* | 12/2002 | Levy | G06F 19/28 |
| 2002/0194201 | A1* | 12/2002 | Wilbanks | G06F 19/709 |
| 2003/0018616 | A1* | 1/2003 | Wilbanks | G06F 17/30286 |
| 2009/0049179 | A1* | 2/2009 | Ehms | G06F 17/30731 709/227 |
| 2009/0216691 | A1* | 8/2009 | Borzestowski | G06F 17/3066 706/11 |
| 2013/0311467 | A1* | 11/2013 | Galle | G06F 17/2795 707/737 |

OTHER PUBLICATIONS

Hu et al., Incorporating coreference resolution into word sense disambiguation,Computational Linguistics and Intelligent Text Processing, 2011, Springer, pp. 1-12.*

(Continued)

*Primary Examiner* — Lamont Spooner
(74) *Attorney, Agent, or Firm* — Renner Kenner Greive Bobak Taylor & Weber

(57) ABSTRACT

A method for processing natural language includes generating a first layer of a multi-layer knowledge network including a plurality of word nodes arranged to represent a word or an entity name, generating a second layer of the multi-layer knowledge network with a natural language dataset, the second layer including one or more instance nodes arranged to represent a word or an entity of the natural language dataset, each of the instance nodes being linked by one or more semantic or syntactic relations to form one or more sub-graphs, and, referencing the first layer of the multi-layer knowledge network with the second layer of the multi-layer knowledge network by establishing a reference between each of the word nodes and each of the instance nodes when the word or the entity name represented by each word node is associated with the word or the entity represented by the instance node.

33 Claims, 25 Drawing Sheets

(56) References Cited

OTHER PUBLICATIONS

Hu et al., Building instance knowledge network for word sense disambiguation, 2011, Proceedings of the Thirty-Fourth Australasian Computer Science Conference—vol. 113, Australian Computer Society, Inc., 2011, pp. 3-10.*

Stoyanov et al., Easy-First Coreference Resolution, 2012, Coling, Citeseer, pp. 1-16.*

* cited by examiner

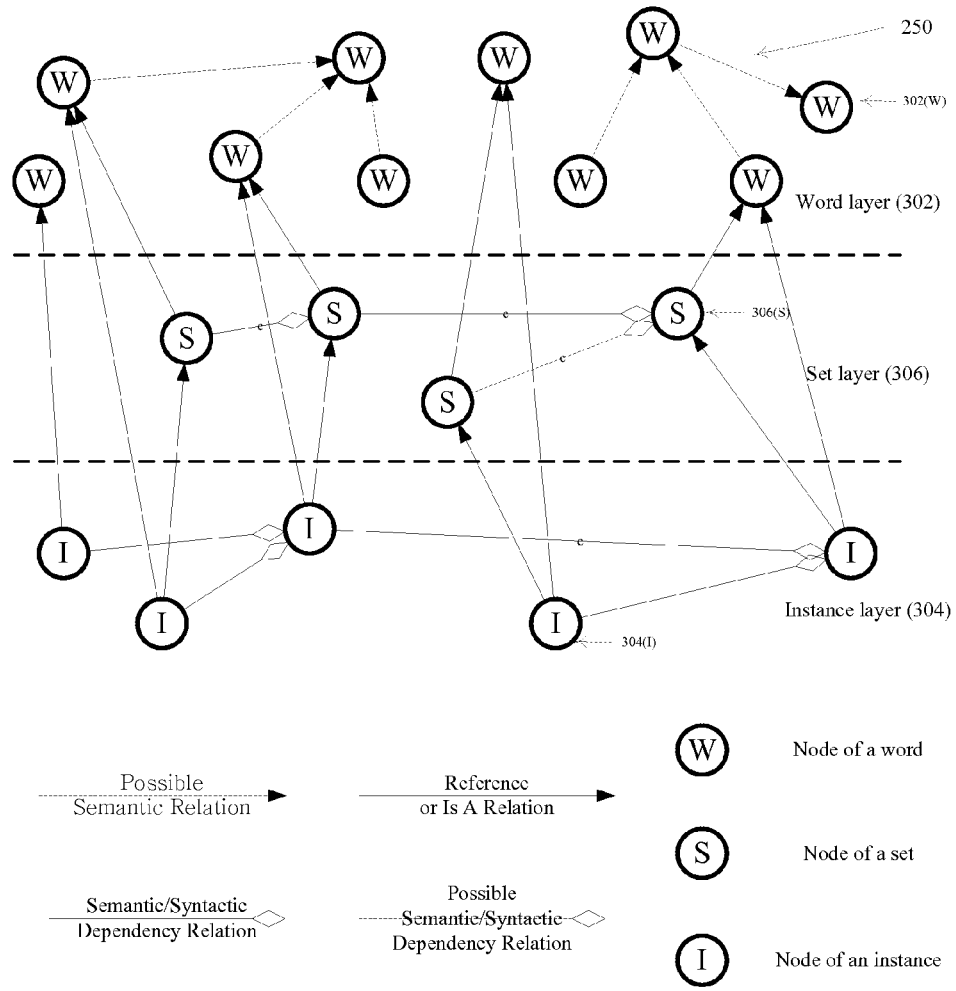
Figure 3 simplified structure of NLSKN

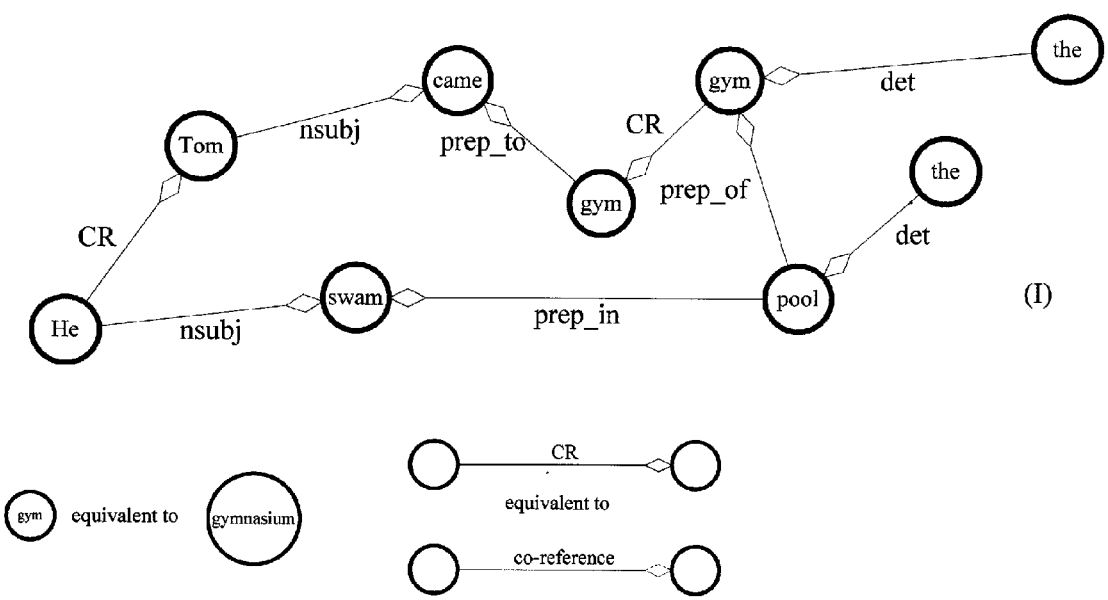
Figure 5B(1)

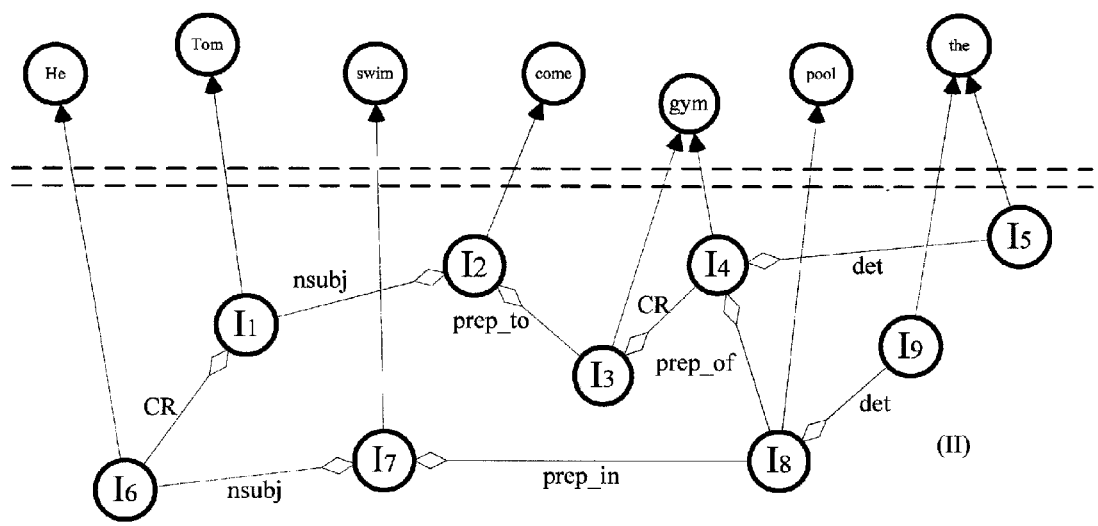
Figure 5B(II)

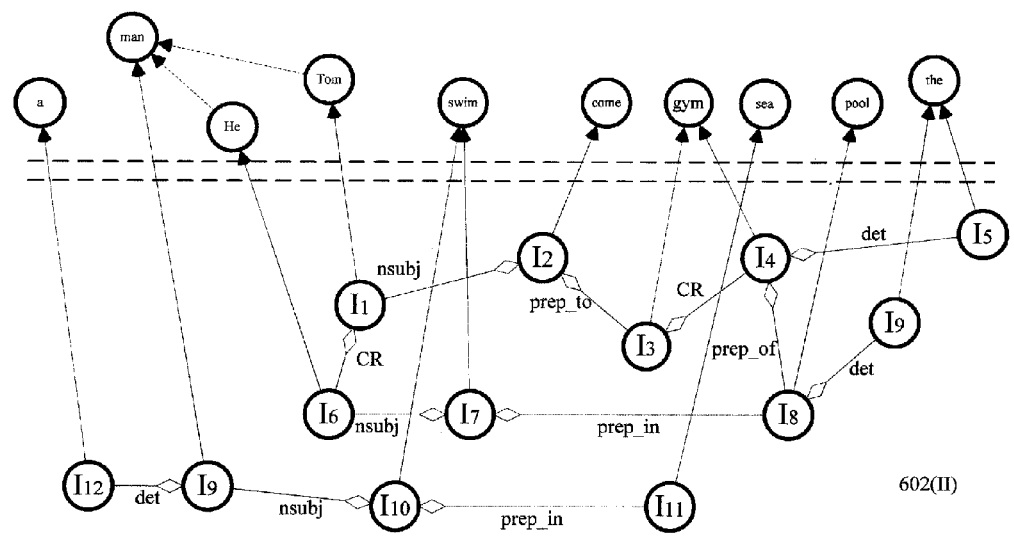
Figure 6A(II)

(A)

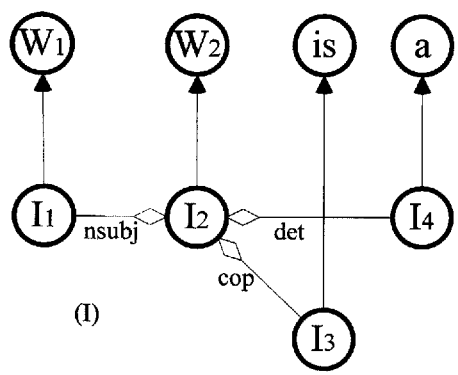 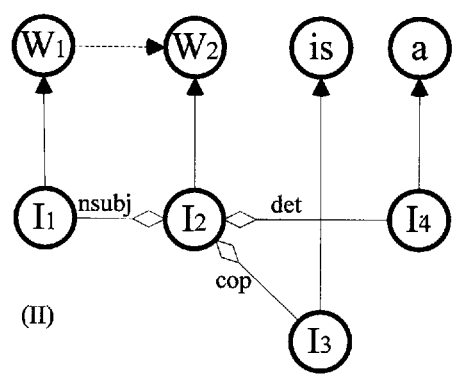
Figure 7D(I)   Figure 7D(II)

SYSTEM AND METHOD FOR PROCESSING NATURAL LANGUAGE

TECHNICAL FIELD

This invention relates to a system and method for processing natural language, and particularly, although not exclusively, to a system and method for processing natural language to generate a knowledge network.

BACKGROUND

Since the dawn of computing, early computer scientists have discussed the concept of using a computer to converse with a human being with natural language. Various attempts have been made including the famous implementation of Eliza which was able to talk to a human person by responding to natural language inputs in the forms of English sentences from a human user.

Despite these attempts, there have not been any significant developments in computer science which has provided a computer with the ability to process natural language from a human being so as to form any meaningful result. One challenge faced by computer scientists is that there is a lack of computation ability to properly process human natural language by computers so as to enable a computer to understand the input and in so doing, being able to provide a meaningful feedback to a user based on knowledge acquired through natural language inputs.

SUMMARY OF THE INVENTION

In accordance with a first aspect of the present invention, there is provided a method for processing natural language comprising the steps of:
  generating a first layer of a multi-layer knowledge network, wherein the first layer of the multi-layer knowledge network includes a plurality of word nodes each arranged to represent a word or an entity name;
  generating a second layer of the multi-layer knowledge network with a natural language dataset, wherein the second layer comprises one or more instance nodes each arranged to represent a word or an entity of the natural language dataset and, wherein each of the one or more instance nodes are linked by one or more semantic or syntactic relations to form one or more sub-graphs; and,
  referencing the first layer of the multi-layer knowledge network with the second layer of the multi-layer knowledge network by establishing a reference between each of the word nodes and each of the instance nodes when the word or the entity name represented by each word node is associated with the word or the entity represented by the instance node.

In an embodiment, the method further comprises the step of: generating a third layer of the multi-layer knowledge network comprising one or more graph based probabilistic rules.

In an embodiment, the one or more graph based probabilistic rules include a condition pattern.

In an embodiment, the one or more graph based probabilistic rules further include a result pattern.

In an embodiment, the third layer of the multi-layer knowledge network is connected to the first layer.

In an embodiment, the plurality of word nodes includes one or more semantic relations between each of the plurality of word nodes.

In an embodiment, the second layer is extended with the one or more probabilistic rules.

In an embodiment, the natural language dataset is a supervised training dataset arranged to include a plurality of sentence portions having one of more words and one or more co-reference tags arranged to reference one or more words of each sentence portion with one or more associated words within the sentence portion or in another sentence portion.

In an embodiment, the second layer of the multi-layer knowledge network is generated by a step of: parsing the supervised training dataset into the one or more dependency graphs such that each of the one or more dependency graphs represents a portion of the training dataset and each of the plurality of instance nodes of each of the one or more dependency graphs represents each word of the portion of the supervised training dataset.

In an embodiment, the step of generating the second layer of the multi-layer knowledge network further includes the step of referencing one or more dependency graphs together by establishing a co-reference relationship between a plurality of instance nodes based on one or more co-reference tags associated with associated words of the supervised training dataset.

In an embodiment, each of the one or more dependency graphs further includes one or more instance syntactic or semantic relations arranged to link two or more instance nodes in each graph which have a syntactic or semantic relationship.

In an embodiment, each of the one or more dependency graphs are appended to the second layer of the multi-layer knowledge network to form the sub-graphs of the second layer.

In an embodiment, a lexical database is processed to generate the first layer of the multi-layer knowledge network by referencing one or more synsets for each word in the lexical database with each word within the lexical database to form a plurality of inter-referenced word nodes each representative of a word and one or more synsets associated with the word.

In an embodiment, the plurality of inter-reference word nodes are inter-referenced by one or more semantic relationships between the plurality of word nodes.

In an embodiment, the plurality of inter-reference word nodes are further inter-referenced by one or more possible semantic relationships between the plurality of word nodes.

In an embodiment, the one or more semantic relationships or the one or more possible semantic relationships are inherited from semantic relations between the synsets of the lexical database.

In an embodiment, the lexical database is WordNet.

In an embodiment, wherein each of the one or more graph based probabilistic rules include: one or more primary set nodes and one or more primary semantic or syntactic relations between the primary set nodes.

In an embodiment, the one or more primary set nodes and the one or more primary semantic or syntactic relations define the condition pattern of an embodiment of the first aspect.

In an embodiment, the one or more primary set nodes and the one or more primary semantic or syntactic relations between the primary set nodes are referenced to the one or more sub-graphs.

In an embodiment, the one or more primary set nodes are linked by one or more secondary syntactic or semantic relationships.

In an embodiment, the one or more graph based probabilistic rules further includes one or more secondary set nodes.

In an embodiment, the one or more secondary set nodes include one or more tertiary semantic or syntactic relations arranged to link the one or more secondary set nodes to the one or more primary set nodes.

In an embodiment, the secondary semantic or syntactic relations includes a probability value arranged to represent the possibility of the semantic or syntactic relationship between a pair of primary set nodes.

In an embodiment, the tertiary semantic or syntactic relations includes a probability value arranged to represent the possibility of the semantic or syntactic relationship between the secondary set node and the primary set node.

In an embodiment, the result pattern in accordance with one embodiment of the first aspect includes the one or more secondary set nodes, the one or more secondary semantic or syntactic relations and the one or more tertiary semantic or syntactic relations.

In an embodiment, each of the primary set nodes is arranged to reference two or more instance nodes in the second layer.

In an embodiment, the two or more instance nodes in the second layer each belong to separate sub-graphs within the second layer.

In an embodiment, the separate sub-graphs are matched to the sub-graph composed by the primary set nodes and the primary syntactic or semantic relations.

In an embodiment, each of the one or more graph based probabilistic rules further include: one or more secondary set nodes.

In an embodiment, the method further comprises the step of: processing the second layer of the multi-layer knowledge network to generate the one or more graph based probabilistic rules.

In an embodiment, the step of processing the second layer of the multi-layer knowledge network to generate the one or more graph based probabilistic rules further comprises the steps of:
   determining a first sub-graph of the second layer;
   comparing the first sub-graph with one or more other sub-graphs of the second layer to find one or more matching sub-graphs; and
   establishing one or more graph based probabilistic rules by processing one or more matching instance nodes and one or more matching instance semantic or syntactic relations of each of the one or more matching sub-graphs.

In an embodiment, the step of establishing the one or more graph based probabilistic rules includes establishing one or more primary set nodes in accordance with one embodiment of the first aspect by inheriting the one of more instance nodes from the first sub-graph to reference each of the matching instance node of each of the one or more matching sub-graphs to form the graph based probabilistic rule.

In an embodiment, further comprises the step of: establishing the one or more primary semantic or syntactic relations of one embodiment of the first aspect, 20 between two or more primary set nodes by inheriting the one or more matching semantic or syntactic relationships from each of the matching instance node of each of the one or more matching sub-graphs referenced by the one or more primary set nodes.

In an embodiment, further comprises the step of: establishing one or more secondary set nodes of one embodiment of the first aspect to reference one or more connected instance nodes connected to the one or more matching sub-graphs.

In an embodiment, further comprises the step of: establishing one or more secondary semantic or syntactic relationships of one embodiment of the first aspect between the two or more primary set nodes by inheriting the one or more semantic or syntactic relations between the matching instance nodes in the matching sub-graphs referenced by the one or more primary set nodes.

In an embodiment, further comprises the step of: establish one or more tertiary semantic or syntactic relations of one embodiment of the first aspect between the one or more primary set nodes with one or more secondary set nodes by inheriting the one or more semantic or syntactic relationships from each of the matching instance node of each of the one or more matching sub-graphs referenced by the one or more primary set nodes with the one or more connected instance nodes connected to the matching sub-graphs referenced by the one or more secondary set nodes.

In an embodiment, the one or more tertiary semantic or syntactic relations or the one or more secondary tertiary semantic or syntactic relations further includes a probability value arranged to represent the possibility of the one or more tertiary semantic or syntactic relations or the one or more secondary tertiary semantic or syntactic relations when an instance sub-graph is matched to the condition pattern.

In an embodiment, further comprises the step of: referencing each of the one or more probabilistic rules to the one or more word nodes of the first layer.

In an embodiment, further comprises the step of establishing one or more secondary set nodes to reference each connected instance node of each of the connected one or more matching sub-graphs.

In an embodiment, the step of extending the second layer with the one or more probabilistic rules includes the steps of:
   selecting a starting sub-graph in the second layer;
   comparing the starting sub-graph with the one or more probabilistic rules to determine one or more matching one or more probabilistic rules; and
   for each of the one or more matched probabilistic rules, identify the one or more secondary syntactic or semantic relationships, one or more secondary set nodes or one or more tertiary syntactic or semantic relations connected to the matching one or more probabilistic rules and inherit the one or more secondary syntactic or semantic relationships, one or more secondary set nodes or one or more tertiary syntactic or semantic relationships to the starting sub-graph.

In an embodiment, the one or more probabilistic rules include one or more sub-graphs having primary set nodes and primary semantic or syntactic relations which are compared with the starting sub-graph.

In an embodiment, the step of inheriting the one or more secondary syntactic or semantic relationships, one or more secondary set nodes or one or more tertiary syntactic or semantic relationships to the starting sub-graph includes referencing the one or more connected instance nodes referenced by the one or more secondary set node to the instance node of the starting sub-graph.

In an embodiment, the step of comparing the first sub-graph with one or more other sub-graphs of the second layer to find one or more matching sub-graphs includes:
   comparing the word of the instance node of the first sub-graph with the word of another instance node of another sub-graph; and, where upon the words being identical or having a possible hypernym-hyponym relation, the one or more matching sub-graphs are deemed to match.

In an embodiment, the step of comparing the first sub-graph with one or more other sub-graphs of the second layer to find one or more matching sub-graphs further includes:
compare the instance syntactic or semantic relationship of the instance nodes of the first sub-graph with the instance syntactic or semantic relation of the instance nodes of the other sub-graph; and,
where upon the instance semantic or syntactic relation of the instance nodes of the first sub-graph are identical with the instance semantic or syntactic relation of the instance nodes of the other sub-graph, the one or more matching sub-graphs are deemed to match.

In accordance with a second aspect of the present invention, there is provided a multi-layer knowledge network generated in accordance with the method for processing natural language.

In accordance with a third aspect of the present invention, there is provided a method for processing a natural language input including the steps of:
generating a co-referenced dependency graph with the natural language input, wherein the co-referenced dependency graph is arranged to represent each word of the natural language input and one or more semantic or syntactic relations between each word;
searching a knowledge network with the co-referenced dependency graph to identifying one or more probabilistic rules;
comparing a condition pattern of each of the one or more graph based probabilistic rules with the co-referenced dependency graph to identify one or more matching sub-graphs in the co-referenced dependency graph when the one or more sub-graphs are matched to the condition pattern;
comparing the connected sub-graph to the matching sub-graph to a result pattern of the matched graph based probabilistic rule; and,
reporting one or more conflicts if one or more sub-graph of the co-referenced dependency graph does match to any condition pattern of the one or more probabilistic rules or the connected sub-graph to the matching sub-graph does not satisfied the result pattern of the matched graph based probabilistic rule.

In an embodiment, the system may discover localizing temporary graph based probabilistic rules in accordance with an embodiment of the first aspect, wherein comparing the first sub-graph with one or more other sub-graphs of the second layer to find one or more matching sub-graphs, the matching sub-graphs are limited in the nodes above an activation threshold or from particular input data source.

In an embodiment, the step of comparing a condition pattern of each of the one or more graph based probabilistic rules with the co-referenced dependency graph includes,
comparing the instance nodes and the syntactic or semantic relations of the co-referenced dependency graph to the primary set nodes and primary semantic or syntactic relations of the one or more probabilistic rules.

In an embodiment, the one or more conflict results is reported if an instance semantic or syntactic relation between two instance nodes in the matching sub-graph is not matched to a secondary semantic or syntactic relation in the result pattern when comparing each instance semantic or syntactic relations and instance nodes directly connected to each matching sub-graphs to the result pattern of the matched graph based probabilistic rule.

In an embodiment, if an instance semantic or syntactic relation is matched to a secondary semantic or syntactic relation but the probability of the secondary semantic or syntactic relation is lower than a predetermined threshold, then the instance semantic or syntactic relation is deemed not to be matching with the secondary semantic or syntactic relation.

In an embodiment, the one or more conflict results is reported if an instance semantic or syntactic relation connected to the matching sub-graph and the connected instance node are not matched to a tertiary semantic or syntactic relation and the connected secondary set node in the result pattern when comparing each instance semantic or syntactic relations and instance nodes directly connected to each matching sub-graphs to the result pattern of the matched graph based probabilistic rule.

In an embodiment, if an instance semantic or syntactic relation is matched to a tertiary semantic or syntactic relation but the probability of the tertiary semantic or syntactic relation is lower than a predetermined threshold, then the instance semantic or syntactic relation is deemed not to be matching with the tertiary semantic or syntactic relation.

In an embodiment, when upon if the co-referenced dependency graph does not match with the condition pattern of one or more graph based probabilistic rules, the graph based probabilistic rules are ignored.

In accordance with a fourth aspect of the present invention, there is provided a method for active learning comprising the steps of:
parsing a plurality of natural language inputs into a plurality of co-referenced dependency graphs, each associated with each of the plurality of natural language inputs; and
determining a correct result or a conflict result associated with each of the plurality of natural language inputs by processing each of the co-referenced dependency graphs.

In an embodiment, the step of determining the correct result or the conflict result includes processing the plurality of natural language inputs.

In an embodiment, further comprises the step of: appending the co-referenced dependency graphs to the second layer of the multi-layer knowledge network if the co-referenced dependency graphs determined to have a correct result.

In an embodiment, the co-referenced dependency graphs determined to have a conflict result with a score being lower than a threshold are reported to a supervisor for additional supervising.

In an embodiment, the co-referenced dependency graph determined to have a conflict result with the score being higher than a threshold, the co-referenced dependency graph is ignored In accordance with a fifth aspect of the present invention, there is provided a method of active learning, wherein the score is calculated based on the number of conflicts found in the co-referenced dependency graphs in accordance.

In accordance with a sixth aspect of the present invention, there is provided a method for processing natural language query comprising the steps of:
parsing the natural language query to generate a co-referenced dependency graph as a graph pattern to represent the natural language query;
finding matching sub-graphs for the graph pattern within the second layer of the multi-layer knowledge network;
determining a score for each matching sub-graph and selecting the matching sub-graph having the maximum score; and processing the selected matching sub-graph to generate an answer in natural language.

In an embodiment, further comprise the steps of:
extending the graph pattern before finding the matching sub-graphs; and
removing the extended semantic or syntactic relations with a probability value lower than a predetermined threshold from the extended graph pattern.

In an embodiment, the graph pattern is extended based on the graph based probabilistic rules.

In an embodiment, further comprises the step of calculating the score based on the matched words, relations and the probabilities of the relations for each particular matching sub-graph.

In an embodiment, the step of calculating the score includes the steps of:
extending the found matching sub-graphs by
selecting a starting sub-graph in the second layer;
comparing the starting sub-graph with the one or more probabilistic rules to determine one or more matching one or more probabilistic rules; and
for each of the one or more matched probabilistic rules, identify the one or more secondary syntactic or semantic relationships, one or more secondary set nodes or one or more tertiary syntactic or semantic relations connected to the matching one or more probabilistic rules and inherit the one or more secondary syntactic or semantic relationships, one or more secondary set nodes or one or more tertiary syntactic or semantic relationships to the starting sub-graph.
rematching the extended matching sub-graphs; and,
calculate the score based on the extended matching sub-graphs.

In accordance with a seventh aspect of the present invention, there is provided a method for generating a natural language knowledge network comprising the steps of:
processing a natural language data set to generate a first instance of the natural knowledge network arranged to include a plurality of data structures representative of the natural language data set;
processing the plurality of data structures to generate one or more probabilistic rules; and
expanding the first instance of the natural knowledge network with the one or more probabilistic rules.

In an embodiment, the one or more probabilistic rules are arranged to associate at least one of the plurality of data structure with one or more other data structures.

In an embodiment, the first instance of the natural knowledge network is expanded by establishing an associating reference between each of the plurality of data structure based on the one or more probabilistic rules.

In an embodiment, the associating references are established when upon the probabilistic rule meets a predetermined condition.

In an embodiment, one or more probabilistic rules each includes a probabilistic variable arranged to represent an accuracy of the associating reference.

In an embodiment, the predetermined condition includes a probability threshold.

In an embodiment, each of the one or more graph based probabilistic rule further includes: one or more secondary set nodes, one or more secondary semantic or syntactic relations between primary set nodes or between a primary set nodes and; a secondary set nodes, wherein each of the one or more secondary semantic or syntactic relations have a probability value arranged to represent the accuracy of the one or more secondary semantic or syntactic relations.

In an embodiment, further comprises the step of: referencing the first layer of the multi-layer knowledge network with the third layer of the multi-layer knowledge network by establishing a reference between each of the word nodes and each of the set nodes when the word represented by each word node is associated with the word represented by each set node.

In accordance with an eighth aspect of the present invention, there is provided a method for processing natural language input comprising the steps of:
parsing the natural language input to one or multiple potential results, each potential result contains one or more dependency graphs generated by a dependency parser arranged to provide multiple potential result;
determining one or more potential co-reference results, each potential co-reference results having one or more co-reference relations between words of the natural language input, by using a co-reference resolution system arranged to provide multiple potential results;
generating multiple potential co-referenced dependency graphs, each co-referenced dependency graph arranged to be based on the combination of a potential dependency parsing result and a potential co-reference resolution result;
calculating a score for each potential co-referenced dependency graph; and,
selecting the co-referenced dependency graph having a maximum score as the best result in co-referenced dependency graphs.

In an embodiment, the method further comprises the step of: finding the conflicts N within each potential co-referenced dependency graph; and determining the score for the potential co-referenced dependency graph as −N.

In accordance with a ninth aspect of the present invention, there is provided a system for processing natural language comprising:
a first knowledge network module arranged to generate a first layer of a multi-layer knowledge network, wherein the first layer of the multi-layer knowledge network includes a plurality of word nodes each arranged to represent a word or an entity name;
a second knowledge network module arranged to generate a second layer of the multi-layer knowledge network with a natural language dataset, wherein the second layer comprises one or more instance nodes each arranged to represent a word or an entity of the natural language dataset and, wherein each of the one or more instance nodes are linked by one or more semantic or syntactic relations to form one or more sub-graphs; and,
a processor arranged to reference the first layer of the multi-layer knowledge network with the second layer of the multi-layer knowledge network by establishing a reference between each of the word nodes and each of the instance nodes when the word or the entity name represented by each word node is associated with the word or the entity represented by the instance node.

In an embodiment, the system further comprises: a third knowledge network module arranged to generate a third layer of the multi-layer knowledge network comprising one or more graph based probabilistic rules.

In an embodiment, the one or more graph based probabilistic rules include a condition pattern.

In an embodiment, the one or more graph based probabilistic rules further include a result pattern.

In an embodiment, the third layer of the multi-layer knowledge network is connected to the first layer.

In an embodiment, the plurality of word nodes includes one or more semantic relations between each of the plurality of word nodes.

In an embodiment, the second layer is extended with the one or more probabilistic rules.

In an embodiment, the second layer is extended with the one or more probabilistic rules by a processor arranged to
select a starting sub-graph in the second layer;
compare the starting sub-graph with the one or more probabilistic rules to determine one or more matching one or more probabilistic rules; and
for each of the one or more matched probabilistic rules, identify the one or more secondary syntactic or semantic relationships, one or more secondary set nodes or one or more tertiary syntactic or semantic relations connected to the matching one or more probabilistic rules and inherit the one or more secondary syntactic or semantic relationships, one or more secondary set nodes or one or more tertiary syntactic or semantic relationships to the starting sub-graph.

In accordance with a tenth aspect of the present invention, there is provided a system for processing a natural language input including:
a parsing module arranged to generate a co-referenced dependency graph with the natural language input, wherein the co-referenced dependency graph is arranged to represent each word of the natural language input and one or more semantic or syntactic relations between each word;
a processor arranged to search a knowledge network with the co-referenced dependency graph to identifying one or more probabilistic rules;
a module arranged to compare a condition pattern of each of the one or more graph based probabilistic rules with the co-referenced dependency graph to identify one or more matching sub-graphs in the co-referenced dependency graph when the one or more sub-graphs are matched to the condition pattern;
a comparator module arranged to compare the connected sub-graph to the matching sub-graph to a result pattern of the matched graph based probabilistic rule; and,
reporting one or more conflicts if one or more sub-graph of the co-referenced dependency graph does match to any condition pattern of the one or more probabilistic rules or the connected sub-graph to the matching sub-graph does not satisfied the result pattern of the matched graph based probabilistic rule.

In accordance with a eleventh aspect of the present invention, there is provided a system for active learning comprising:
a parser with a co-reference resolution system arranged to parse a plurality of natural language inputs into a plurality of co-referenced dependency graphs, each associated with each of the plurality of natural language inputs; and
a conflict check module arranged to determine a correct result or a conflict result associated with each of the plurality of natural language inputs by processing each of the co-referenced dependency graphs.

In accordance with a twelfth aspect of the present invention, there is provided a system for processing natural language query comprising:
a parser arranged to parse the natural language query to generate a co-referenced dependency graph as a graph pattern to represent the natural language query;

a graph matching module arranged to find matching sub-graphs for the graph pattern within the second layer of the multi-layer knowledge network;
an assessing module arranged to determine a score for each matching sub-graph and selecting the matching sub-graph having the maximum score; and
a processor arranged to process the selected matching sub-graph to generate an answer in natural language.

BRIEF DESCRIPTION OF THE DRAWINGS

Embodiments of the present invention will now be described, by way of example, with reference to the accompanying drawings in which:

FIG. 3 is an illustration of an example structure of a knowledge network in accordance with one embodiment of the present invention;

FIG. 4B(II) is an illustration showing a second structural formation of the word layer generated by the processes of FIG. 4A;

FIG. 4B(III) is an illustration showing a third structural formation of the word layer generated by the processes of FIG. 4A;

FIG. 5B(I) is an illustration showing a first structural formation of the instance layer generated by the processes of FIG. 5A;

FIG. 5B(II) is an illustration showing a second structural formation of the instance layer generated by the processes of FIG. 5A;

FIG. 6A(II) is an illustration showing a second structure manipulation of the knowledge network in an embodiment of the graph matching process;

FIG. 7B(B) is an illustration to show a first structural formation of the set layer generated by the processes of FIG. 7A;

FIG. 7B(C) is an illustration to show a second structural formation of the set layer generated by the processes of FIG. 7A;

FIG. 7D(I) is an illustration to show a matching sub-graph in a NLSKN;

FIG. 7D(II) is an illustration to show a possible superset/subset relation between the two nodes W1 to W2 of the matching sub-graph of FIG. 7D(I);

DETAILED DESCRIPTION OF THE PREFERRED EMBODIMENT

Figure 1:
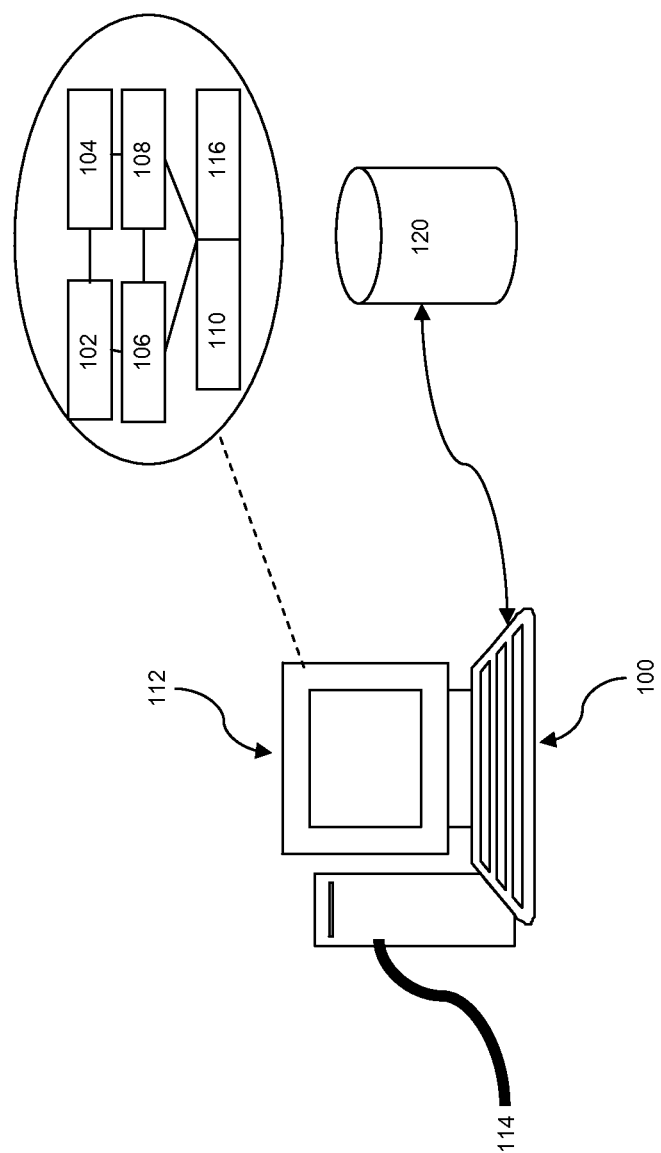
FIG. 1 is a schematic block diagram of a computing device arranged to operate as a system for processing natural language in accordance with one embodiment of the present invention.

Referring to FIG. 1, an embodiment of a computing system 100, computer, server, apparatus, processor or any other device arranged to implement or operate a system for processing natural language, which in one example embodiment comprises:
- a first knowledge network module arranged to generate a first layer of a multi-layer knowledge network, wherein the first layer of the multi-layer knowledge network includes a plurality of word nodes each arranged to represent a word or an entity name;
- a second knowledge network module arranged to generate a second layer of the multi-layer knowledge network with a natural language dataset, wherein the second layer comprises one or more instance nodes each arranged to represent a word or an entity of the natural language dataset and, wherein each of the one or more instance nodes are linked by one or more semantic or syntactic relations to form one or more sub-graphs; and,
- a processor arranged to reference the first layer of the multi-layer knowledge network with the second layer of the multi-layer knowledge network by establishing a reference between each of the word nodes and each of the instance nodes when the word or the entity name represented by each word node is associated with the word or the entity represented by the instance node.

In this example embodiment of the computing system 100, the interface and processor are implemented by a computer having an appropriate user interface. The computer may be implemented by any computing architecture, including stand-alone PC, client/server architecture, "dumb" terminal/mainframe architecture, or any other appropriate architecture. The computing device is appropriately programmed to implement the invention.

In this embodiment, the computing device may include a storage module, such as a database either locally, remotely or both so as to store data used to provide a system for processing natural language. This data may include, without limitation a multi layered knowledge network arranged to store knowledge processed from natural language inputs. The knowledge network, may exist in the form of a data structure of multiple layers of data nodes, although as a person skilled in the art would appreciate, the term layers when used with reference to a knowledge network may not be limited to a define structure of various layers, but is an abstract term use to describe the presentation of information in an organised form. Thus the data relating to the knowledge network may exist as multiple reference structures or in another structure suitable. For example, a word list or a word index can be considered as the word layer of the multiple layer knowledge network.

Referring to FIG. 1 there is a shown a schematic diagram of a computer system 100 which in this embodiment comprises a server 100. The server 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The service may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

The system has a database 120 residing on a disk or other storage device which is arranged to store data 122 for the operation or implementation of the system for processing natural language. The database 120 may also be in communication with an interface, which is implemented by computer software residing on the server 100.

Figure 2A:
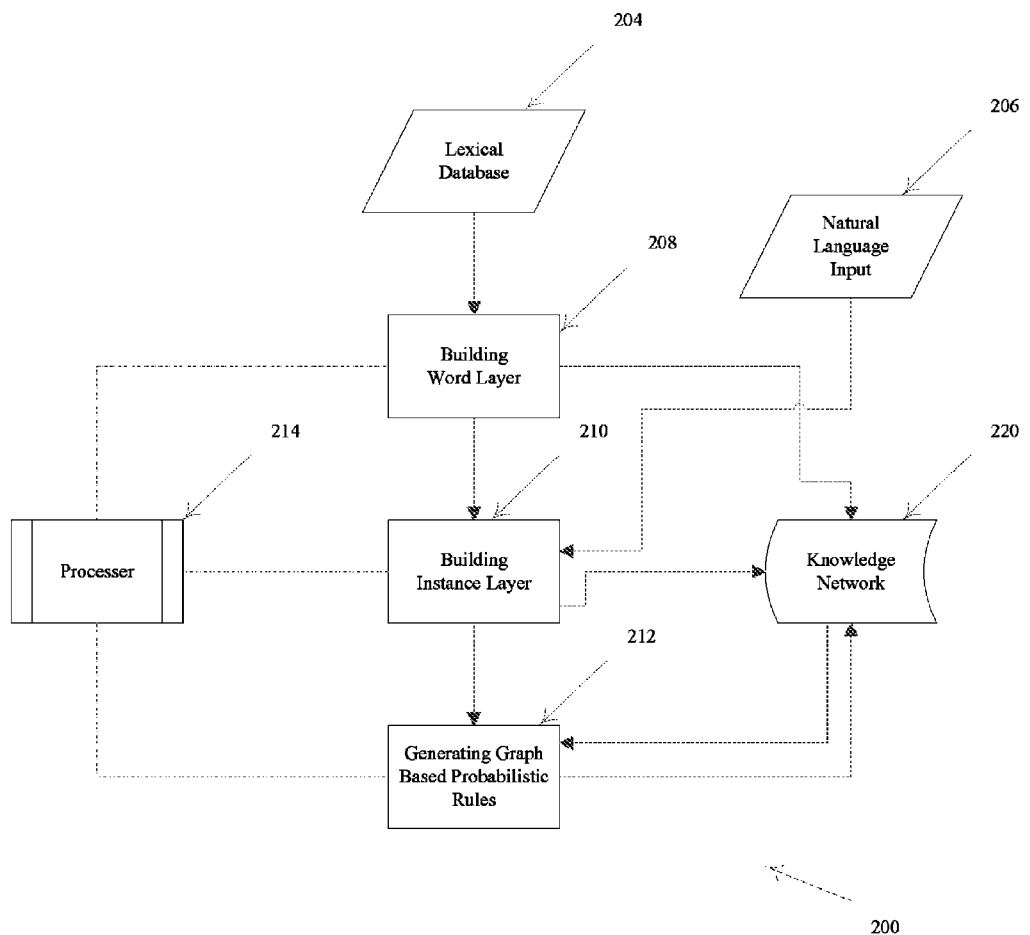
FIG. 2A is a block diagram of a system for processing natural language in accordance with the embodiment of FIG. 1.

With reference to FIG. 2A, there is illustrated a data flow and block diagram of one embodiment of the present invention. In this embodiment, the system for processing natural language 200 comprises:
- a first knowledge network module arranged to generate a first layer of a multi-layer knowledge network, wherein the first layer of the multi-layer knowledge network includes a plurality of word nodes each arranged to represent a word or an entity name;
- a second knowledge network module arranged to generate a second layer of the multi-layer knowledge network with a natural language dataset, wherein the second layer comprises one or more instance nodes each arranged to represent a word or an entity of the natural language dataset and, wherein each of the one or more instance nodes are linked by one or more semantic or syntactic relations to form one or more sub-graphs; and, a processor arranged to reference the first layer of the multi-layer knowledge network with the second layer of the multi-layer knowledge network by establishing a reference between each of the word nodes and each of the instance nodes when the word or the entity name represented by each word node is associated with the word or the entity represented by the instance node.

In another embodiment, the system for processing natural language further comprises a probabilistic rule module 212 arranged to generate a third layer of the multi-layer knowledge network 220 comprising one or more graph based probabilistic rules. In some example embodiments, a name entity recognition system such as, but without limitations, a Stanford Named Entity Recognizer may be employed to recognize the entity names.

Referring to FIG. 2A, the system 200 includes a processor 214 which is arranged to operate a word layer generator module 208, an instance layer module 210 and a probabilistic rule module 212. The processor may be a CPU or processing device arranged to execute computer or electronic instructions so as to perform the functions of each of the three modules 208, 210 and 212. In some examples, the modules 208, 210 and 212 may be implemented as individual program modules each arranged to operate a particular function which will be described in detail below.

For each of the three modules, 208, 210 and 212, the processor may be arranged to read, write or otherwise access a knowledge network 220 which is arranged to store knowledge derived from natural language inputs or existing knowledge stored within so as to generate a knowledge database acquired from input data or natural language received from a user or other external source. This knowledge, which is stored within the knowledge network 220 thus, in one example, be able to provide a computer system or process with information which can be subsequently used to process a natural language input from a user, either in the form of understanding a natural language input and responding with knowledge within the network 220 or to assess the correctness or conflict with a new natural language input. The knowledge network 220 can be used in many different ways, but in one example, it can be used to make sense of any subsequent natural language input.

In this example, the knowledge network 220 is a multiple layer knowledge network which includes a word layer, an instance layer and a set layer each of which is arranged to store particular data relating to natural languages. Each of these layers is further described below.

In this example flow diagram as shown in FIG. 2A, the primary process of the system is to build the multiple layer knowledge network 220 via a supervised learning method as below. Other methods are also possible to initiate the building process of the knowledge network 220.

In this first example, a lexical database 204 having a records of words and their natural language relationships is used as a data source by a word layer generator module 208 to generate the word layer of the multiple layer knowledge network 220. In this worked example. The lexical database is WordNet™ although other lexical databases are also possible. Each word of WordNet is combined with the synsets of the word to generate a word node of the word layer. The semantic relations between the synsets are also inherited from the lexical database 204 so as to be the possible semantic relations between the word nodes. A further description as to the methods which are used to generate the word layer is further provided below with reference to FIGS. 4A and 4B.

After the word layer has been generated, the instance layer of the multiple layer knowledge network 220 is built from a natural language training set 206 by the instance layer module 210. In this example, the instance layer module 210 operates on a supervised learning method by using the natural language input of the training set 206 to learn knowledge to build the instance layer.

Preferably, the training set 206 contains a set of natural language texts. Each text is tagged to represent one or more co-reference relations between words. The term co-reference may, in this embodiment, has an ordinary meaning in the field of linguistics and is representative of a situation when multiple expressions in a sentence or document refer to the same thing; or in linguistic jargon, they have the same "reference."

This training set 206 may then be entered as an input to the system 200 upon which each natural language text in the training set is parsed by a dependency parser. Examples of a dependency parser may include, without limitations, the Stanford dependency parser. The parser is then arranged to parse the natural language text into one or more dependency graphs.

In this example, each dependency graph is arranged to represent a sentence in the text from the training set 206. Co-reference relations are then added between the words node with the same co-reference tag in the dependency graphs. As a result of this process, the dependency graphs are thus connected to one or more co-referenced dependency graph.

A co-referenced dependency graph may in some examples, include one or more nodes and syntactic or semantic relations between the nodes. Each node represents a word or an entity. The semantic relations may be co-reference, part of or other semantic relations. The syntactic dependency relations may be nsubj, dobj or other syntactic dependency relations.

The co-referenced dependency graphs are then added to the instance layer of the multiple layer knowledge network 220. This process may be completed by first having each word node in the co-referenced dependency graph being converted to an instance node and referenced to the word node in the word layer which represents the same word. Embodiments of the instance layer module are further described below with reference to FIGS. 5A to 5B.

In one example, the supervised learning method may be the primary method to build the initial knowledge of a knowledge network, which may also be known as a multi layer knowledge network or the Natural Language Semantic Knowledge Network (NLSKN). As it may need a dependency parser to parse the text in order to maximize the precision of dependency parsing, the co-reference tagged natural language texts of the supervised training set may be written in simple English sentences. This way, like human children that need enlightenment books, the supervised training set is considered as the enlightenment book for NLSKN. The goal of the supervised learning process is to build a high precision knowledge base for NLSKN.

In one optional embodiment, after the module 210 completes the above operations, the set layer is generated with the information within the instance layer by the probabilistic rule module 212. In this optional embodiment, the set layer is composed by a set of graph based probabilistic rules.

Preferably, each graph based probabilistic rule contains a condition graph pattern and a probabilistic result graph pattern. A condition pattern is an induction of a set of sub-graphs in the instance layer and can also be considered as the index of a class of instance contexts. The probabilistic result pattern can be considered as an "imagination in a context" when it satisfies the condition pattern. Accordingly, the probabilistic result pattern may be considered as an imperfect reference between a set of words and one or more particular word nodes. As this imperfect reference may be correct, but may also be considered incorrect, the reference between the set of words and the word node can be considered "imagination" in a natural language context.

Each node in the set layer may also be considered as the index of a class of instance nodes. The classifications of the instance nodes are based on the difference of contexts. The probabilistic rule module 212 is further described below with reference to FIGS. 7A and 7B.

Figure 2B:
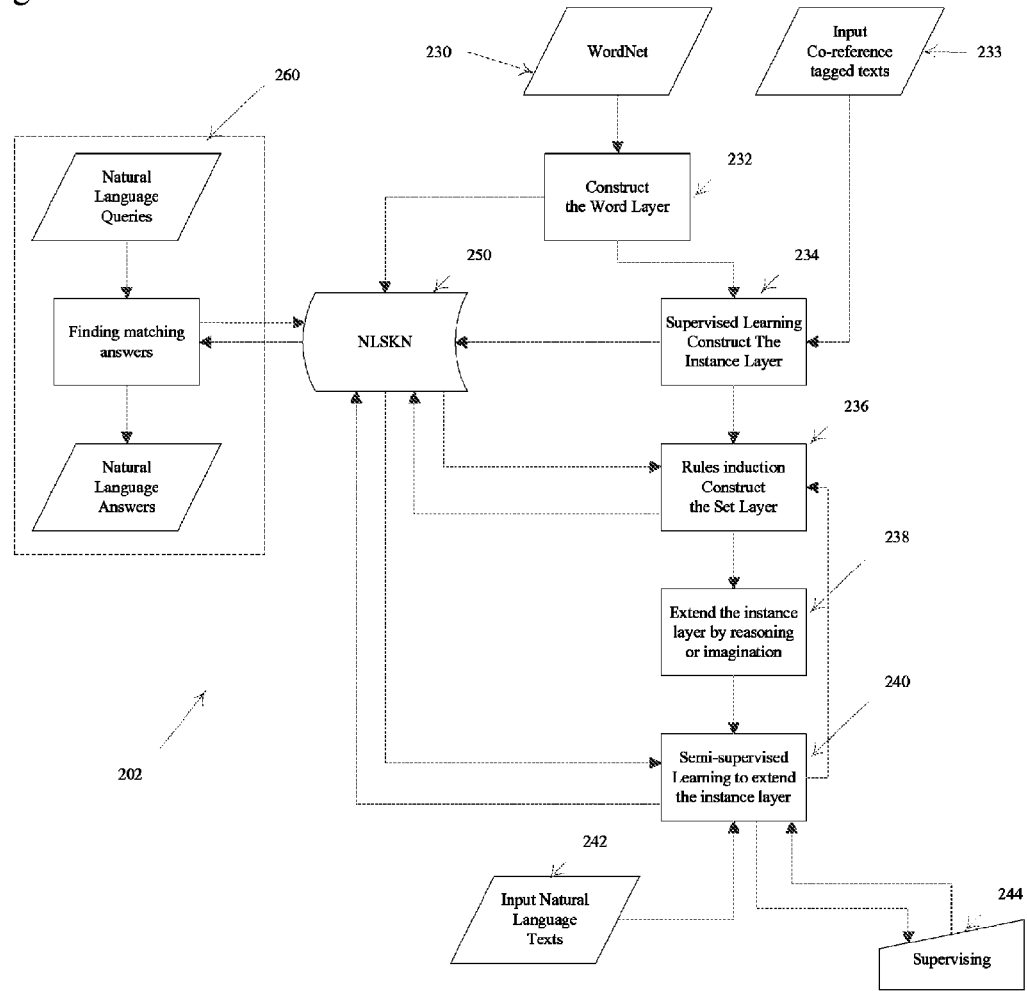
FIG. 2B is a block diagram of a system for processing natural language in accordance with another embodiment of the present invention.

Referring to FIG. 2B, there is illustrated another embodiment of the system for processing natural language. In this embodiment, the semantic engine is based on a multiple layer knowledge network 250 which contains a word layer, an instance layer and a set layer and is similar or identical to the knowledge network 220.

In this example, the word layer is built from the data of a lexical database 230 such as WordNet. Each word of WordNet is combined with the synsets of the word to generate a word node of the word layer. The semantic relations between the synsets are inherited to be the possible semantic relations between the word nodes (232). The instance layer of the multiple layer knowledge network 250 is then built from a natural language training set 233 based on a supervised learning method. The training set contains a set of natural language texts with each text being tagged to represent the co-reference relations between words (233). Each natural language text is then parsed by a dependency parser (for example: Stanford dependency parser) into one or more dependency graphs. Each dependency graph represents a sentence in the text and co-reference relations are added between the words node with the same co-reference tag in the dependency graphs. The dependency graphs are then connected to one or more co-referenced dependency graph by this way.

The co-referenced dependency graphs are added (234) to the instance layer of the multiple layer knowledge network 250. Each word node in the co-referenced dependency graph is converted to an instance node and referenced to the word node in the word layer which represents the same word.

Once the instance layer is generated (234), the set layer is then generated (236) based on the data of the instance layer. The set layer is composed by a set of graph based probabilistic rules with each graph based probabilistic rule contains a condition graph pattern and a probabilistic result graph pattern. A condition pattern is an induction of a set of sub-graphs in the instance layer. A condition pattern can be also considered as the index of a class of instance contexts. The probabilistic result pattern can be considered as the imagination in a context when it satisfies the condition pattern. Each node in the set layer can be considered as the index of a class of instance nodes. The classifications of the instance nodes are based on the difference of contexts (236).

Based on the graph based probabilistic rules of the set layer, the instance layer can be extended by reasoning or imagination (238). If an instance sub-graph in the instance layer can be matched to the condition pattern of a probabilistic rule, the sub-graph can be extended by inheriting the nodes (238), relations with probabilities of the result pattern of the probabilistic rule. Inheriting the result relations with probability 100% is considered as reasoning and thus can be appended to the instance layer to grow the instance layer with this new knowledge. However, if the probability of a relation is lower than 100%, the relation inheriting is considered as imagination as it cannot be considered to be fully correct and thus may or may not be added to the instance layer. In some examples, a threshold value can be used to assess when the probabilistic rule is considered to be worthy of inclusion into the instance layer.

The process of generating or update the graph based probabilistic rules 236 is a continuous and repetitive process so as to extend the instance layer. By extending the instance layer, the knowledge stored within the knowledge network 250 can be increased, thus allowing natural language inputs or interactions with users or other sources to increase the knowledge of the network 250.

In some other embodiments, the graph based probabilistic rules may also be pre-defined whilst some of the pre-defined rules may introduce some particular semantic relations as the part of result patterns when some sub-graphs satisfy the condition pattern. Co-referenced dependency graphs may also be extended by these rules, then include the pre-defined semantic relations.

In this embodiment, with the initial knowledge in the multiple layer knowledge network 250, an active learning method (240) is used to acquire more knowledge in comparable low cost. Natural language texts (242) are inputted as the knowledge source. Once inputted, an input text is parsed by a dependency parser to generate one or more dependency graphs. Preferably, the text is automatically tagged by a co-reference resolution system (For example: Stanford Deterministic Co-reference Resolution System) such as by, as an example, whereby there is an entry of three sentences 1—"Tom is a boy."
2—"Rose is his sister."
3—"She is a student."

Each sentence (1, 2 and 3) is tagged with reference tags which show the co-reference between related words or terms. Thus the sentences would now be represented as "Tom[1] is a boy. Rose[2] is his[1] sister. She[2] is a student."

The dependency graphs are connected by the co-reference relations based on the co-reference tags to form one or more co-referenced dependency graphs.

Based on the graph based probabilistic rules in the set layer of the multiple layer knowledge network 250, the system attempts to examine the co-referenced dependency graphs to find semantic conflicts. If there is no semantic conflict in the one or more co-referenced dependency graphs of the input text, the system believes the text can be understood and is reasonable based on the existing knowledge. Under these conditions, the one or more co-referenced dependency graphs are appended to the instance layer of the multiple layer knowledge network 250. If the conflicts are more than a threshold, all the one or more dependency graphs are ignored because the system can not understand the text.

In one example, as illustrated with reference to FIG. 2B, if there are conflicts but less than the threshold, the system may report to a supervisor to ask for additional supervising (244). The supervisor may provide co-reference tags or choose the correct co-referenced dependency graph within several potential co-referenced dependency graphs generated by the system.

In some examples, the additional supervising is advantageous in that the process of supervising is to provide a learning environment in which the system could build knowledge into the knowledge network by processing natural language inputs, assessing it for correctness by way of assessing the input for conflict and provided the conflict of the input is zero or below a predetermined threshold, the input may then be used to extend the knowledge network as a form of precise knowledge. As the precision of the learnt knowledge may depend on the precision of the automated dependency parsing and the co-reference resolution of the system, the process of supervising may therefore be advantageous in that it can assist in ensuring there is a higher level of precision of the co-reference tags and the dependency graphs when the system has not enough confidence for its automated process.

Initially, when the multiple layer knowledge network 250 is small, most of the input texts may not be understood. As a result, the active learning can only learn some very simple text. The process of semantic examination can be operated by attempt to guarantee all the knowledge in the multiple layer knowledge network is consistent to each others, further details regarding the process of semantic examination are described below with reference to FIGS. 9A and 9B.

In some embodiments, the rules in the knowledge network or the NLSKN are based on a limited training set. When new knowledge is learnt, some rules in NLSKN may be found conflict to each others. In these situations, the system may then report to the supervisor for additional supervising and from this point, allow the supervisor to choose a correct rule between a pair of conflict rules.

As the probabilistic rules are approximately correct, it may be possible to improve the resource usage of a system for processing natural language by limiting the reasoning generated from the probabilistic rules. This is effectively a pruning method whereby probabilistic rules are "pruned" based on their probability of correctness. With more and more knowledge added to the multiple layer knowledge network, the probabilistic rules are updated and new conflicts may be found. The system will ask for additional supervising when internal conflicts are found.

The knowledge in the multiple layer knowledge network 250 may be learnt from natural language input or generated by the internal reasoning or imagination process. Once the knowledge is stored within the network, the knowledge can be employed for a natural language question and answer system (260). In these example embodiments, a natural language question is parsed into dependency graphs by the natural language question and answer system (260) and then connected so as to form a co-referenced dependency graph.

Once the co-referenced dependency graph is formed, it is extended based on the probabilistic rules in a similar manner in which the instance layer is extended with the probabilistic rules (238). The advantageous of this example is that because a question may be expressed in natural language in a number of different ways, by extending the co-reference dependency graph with the probabilistic rule, we can form an extended co-reference dependency graph which may include various manners in which the question is asked, and thus allowing for a greater chance that relevant knowledge within the knowledge network can be extracted to answer the question. From a human way of thinking, this is much like the process whereby a question is interpreted by a respondent with common sense or knowledge of the respondent so as to expand their capabilities in responding properly. As an example, assuming a natural language question of "Who is Tom's father?" is inputted into the system and also assuming that the system is connected to a knowledge network which include the knowledge "Tom is Joe's son." in which case, after processing the extended co-referenced dependency graph of the question "Who is Tom's father" will include a reference or connection, via the probabilistic rule, to a question "Whose son is Tom?" in which case, an answer of "Joe" can be generated.

The extension to the dependency graph to form the extended dependency graph may take place if the co-reference dependency graph is found to be matching with the condition pattern within a set layer of the multi layer knowledge network where there may be one or more probabilistic rules.

In these examples, the extended co-referenced dependency graph is used as a graph pattern by a graph matching method, described below with reference to FIGS. 6A to 6C in order to find matching sub-graphs in the instance layer of the multiple layer knowledge network 250. It follows that in some examples, an evaluation is made to the extended matching sub-graphs to find the best matching sub-graph as there could be more than one matching sub-graph. Based on the best matching sub-graph, the sub-graph is processed so as to form an answer in natural language. Further details regarding the query/answer system are described below with reference to FIG. 11.

With reference to FIG. 3, there is illustrated an embodiment of a knowledge network 250. In this embodiment, there is illustrated a simplified structure of one embodiment of a knowledge network, which may also be referred to as a Natural Language Semantic Knowledge Network (NLSKN).

In this embodiment, the knowledge network 250 has three layers, a word layer (302), set layer (306) and instance layer (304). In each layer there may be nodes which represent the data structure of the specific layer. For example in the word layer, there are word nodes 302, in the set layer there are set nodes 306(S) and in the instance layer there are instance nodes 304(I). These nodes are linked or referred with semantic relations which allow the system to query the information of each layer.

There are possible semantic relations between words. As one example, each word may be a subset(hyponym) of other words. For example dog may be a subset(hyponym) of mammal. Besides, dog may also be a subset(hyponym) of pet. The possible superset(hyperonym)/subset(hyponym) relations between words are not restrictive.

In one embodiment, a word may be referenced to one or multiple instance individuals or sets. A set is referenced to a word. A set may have one or multiple instance individuals.

There maybe semantic relations or syntactic dependency relations between individuals.

There maybe semantic relations or syntactic dependency relations between sets. The semantic relations may be co-reference, part of or other semantic relations. The syntactic dependency relations may be nsubj, dobj or other syntactic dependency relations.

These semantic/syntactic dependency relations may also have probabilities between 0 and 1 which reflect the correctness or logic of the semantic/syntactic dependency relations. The probabilities of confirmed relations are 1.

FIG. 3 shows the three layers of NLSKN as the word layer 302, the set layer 306 and the instance layer 304. The first step to build NLSKN is to construct the word layer. Essentially the word layer is a simplified semantic network. It can be constructed by the data from WordNet.

In this embodiment, the knowledge network or the NLSKN is unique in that the knowledge of NLSKN has an instance layer 304 which is constructed with examples stored within the instance layer in the form of instance nodes 304(I). For example, there are three sentences 1, A car runs on the road.
2, A stone car runs on the road.
3, A car without wheels runs on the road.

The sentence 2 and sentence 3 are not reasonable in common sense. In a word based concept level semantic knowledge network, a car can run, and a road can be run on. The conflict to the common sense in the sentence 2 and 3 can not be recognized by the knowledge of concept level semantic networks. In a phrase based concept level semantic knowledge network, "stone car" and "car without wheel" should be both separate concepts if the common sense is included. And the combination phrases like "stone car" and "car without wheel" are unlimited.

In one example with using the NLSKN, these three sentences are parsed into three dependency graphs to compare with the existing sub-graphs in the instance layer. Several examples of stone car are found but no example of stone car can run. Similarly, no car can run without wheels in the examples. So NLSKN can find the conflict from a common sense point of view.

The set layer 306 of NLSKN is composed by a group of graph based probabilistic rules. Each probabilistic rule is composed by a condition pattern and connected result pattern. A condition pattern is composed by one or more set nodes and semantic or syntactic relations between the nodes. A result pattern is composed by some semantic or syntactic relations with probabilities and connected set nodes. Each set node represents a set of instance nodes within the special context represented by the condition pattern and the result pattern. These set nodes can be considered as the classification of the instance nodes. Different from the manual defined classification such as synsets of WordNet, most of the set nodes 306(S) are discovered automatically from the instance sub-graphs.

Figure 4A:
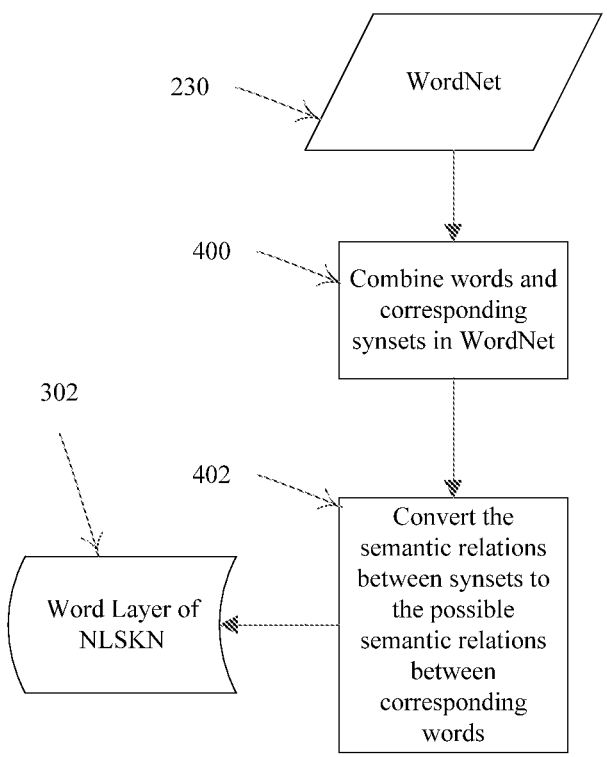
FIG. 4A is a flow chart showing an embodiment of the processes in generating a word layer of a knowledge network of FIG. 3.
Figure 4B:
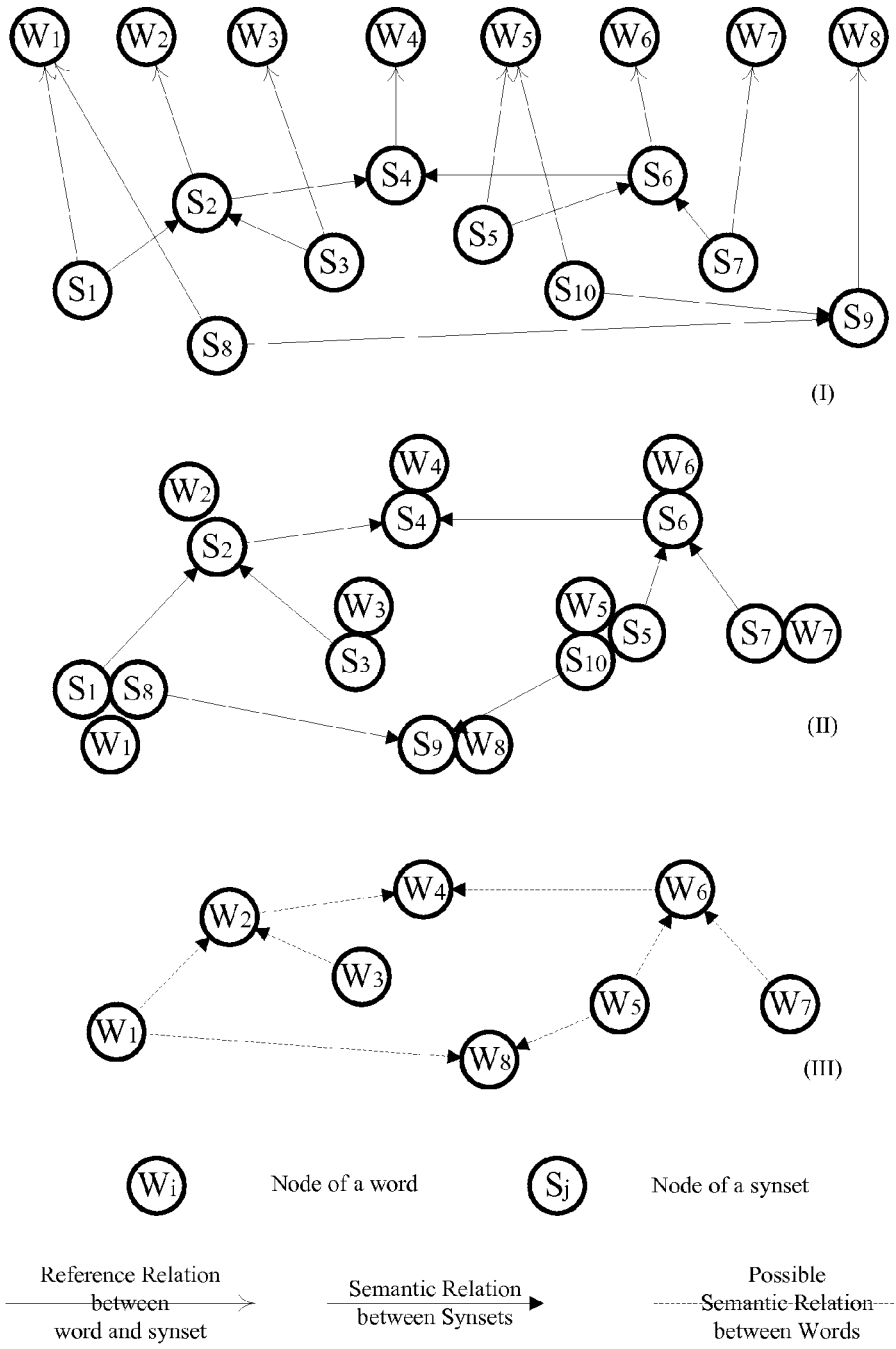
FIG. 4B(I) is an illustration showing a first structural formation of the word layer generated by the processes of FIG. 4A.

With reference to FIGS. 4A and 4B, there is shown the process to construct word layer of NLSKN in accordance with one embodiment. In this example embodiment the NLSKN is constructed by use of a lexical database such as WordNet, although other forms of lexical database or lexical data in natural language form may also be used.

In this example, WordNet includes two layers as the word layer and the synset layer. A word has one or multiple synsets. The semantic relations are between synsets. In this embodiment, the process includes a combination of each word with its synsets (400) and inherits the semantic relations of its synsets (402). For example, in FIG. 4B(I), W1 has two synsets as S1 and S8. W1 is then combined with S1 and S8 in FIG. 4B(II). The combined word node W1 in FIG. 4B(III) has two semantic relations with W2 and W8. The words and semantic relations between words can be extended.

Figure 5A:
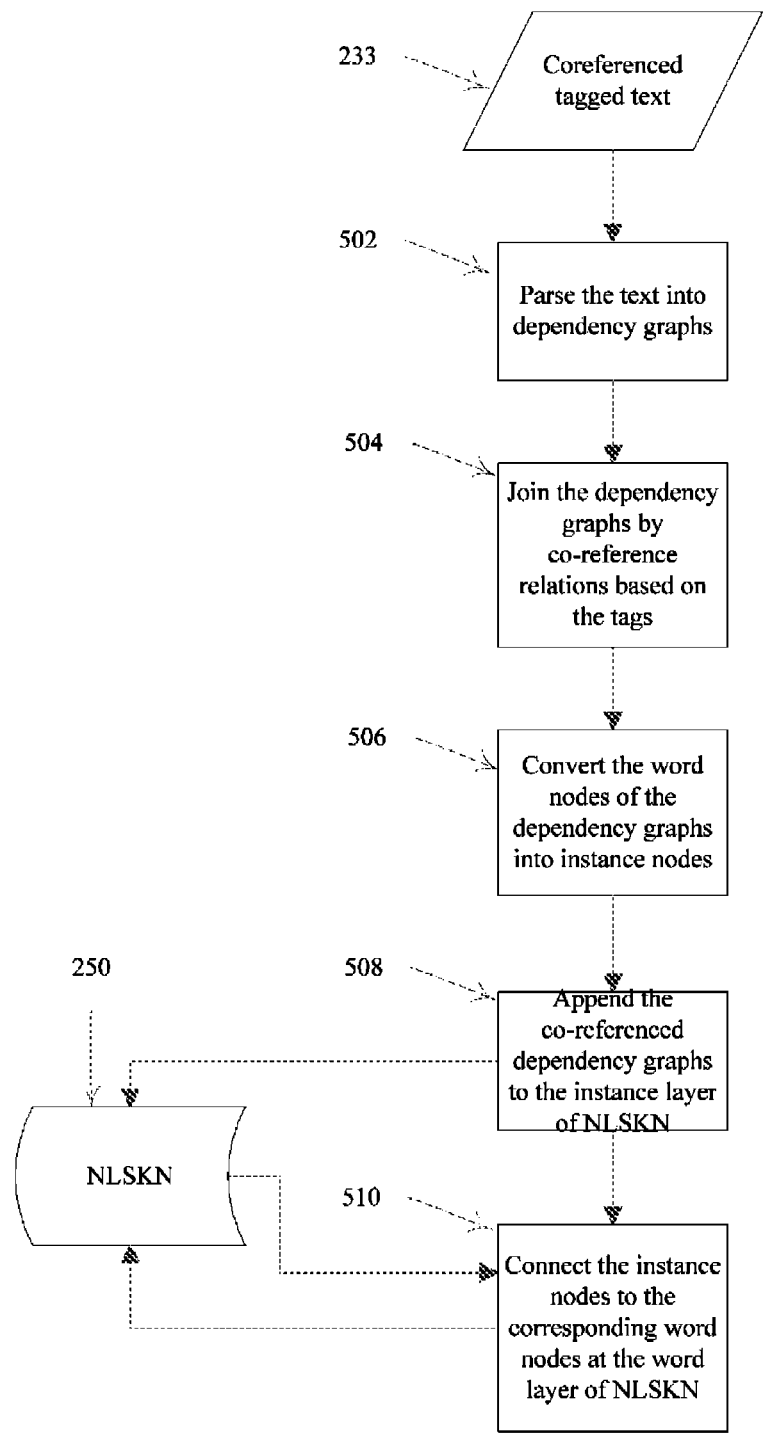
FIG. 5A is a flow chart showing an embodiment of the processes in generating an instance layer of a knowledge network of FIG. 3.

After this process is complete and with reference to FIGS. 5A and 5B, the instance layer is constructed with a natural language training set by a supervised learning method. As a supervised method, co-reference tags are added to natural language sentences to be learnt. Then the sentences are parsed into dependency graphs 502. For example, Stanford Dependency Parser can be used to parse the sentences. A dependency graph is composed by word nodes and semantic/syntactic dependency relations. Co-reference relations are added between the co-referenced word nodes to connect the dependency graphs 504. Finally, the word nodes of the dependency graphs are converted into instance nodes 506 and the reference relations are added between the instance nodes and the corresponding word nodes 508, 510 of the NLSKN.

For example, there are two co-reference tagged sentences "Tom[1] came to the gymnasium[2]. He[1] swam in the pool of the gymnasium[2]." At first, the sentences are parsed into two dependency graphs
 nsubj(came-2, Tom-1)
 det(gymnasium-5, the-4)
 prep_to(came-2, gymnasium-5)
 nsubj(swam-2, He-1)
 det(pool-5, the-4)
 prep_in(swam-2, pool-5)
 det(gymnasium-8, the-7)
 prep_of(pool-5, gymnasium-8)

Then two co-reference relations are added between co-referenced words.
 co-reference(Tom-1, He-1)
 co-reference(gymnasium-5, gymnasium-8)

Finally, convert the words as instance nodes and connect them to the corresponding word nodes in the NLSKN.

FIG. 5B(I) shows the connected dependency graphs. The words of the dependency graphs are converted into instance nodes and connected to the corresponding word nodes in FIG. 5B(II).

As shown in these embodiments, the instance layer can be extended based on the graph based probabilistic rules in the set layer. This extending process can be considered as being similar to the process of reasoning or imagination of a human. The extended part of the instance layer is inherited from the result patterns of matched probabilistic rules. When the probability of a relation in the extended part is 100%, it is similar to reasoning. If the probability is smaller than 100%, it is similar to imagination.

As natural language is not completed, sometimes a word or a phrase only shows a clue of a complicated meaning. An idiom may represent a story or a semantic pattern with a complicated structure among different elements in the context. To understand these hidden meaning of natural language, reasoning and imagination are necessary.

Accordingly, the process of extending the instance layer based on the graph based probabilistic rules can be considered as an attempt to discover the hidden meaning in natural language.

Figure 6A:
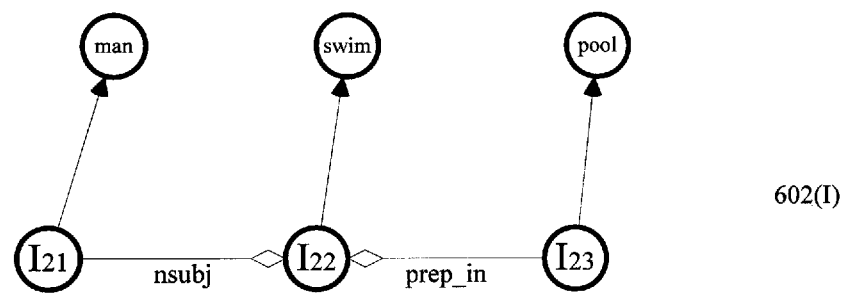
FIG. 6A(I) is an illustration showing an initial structure manipulation of the knowledge network in an embodiment of the graph matching process.
Figure 6B:
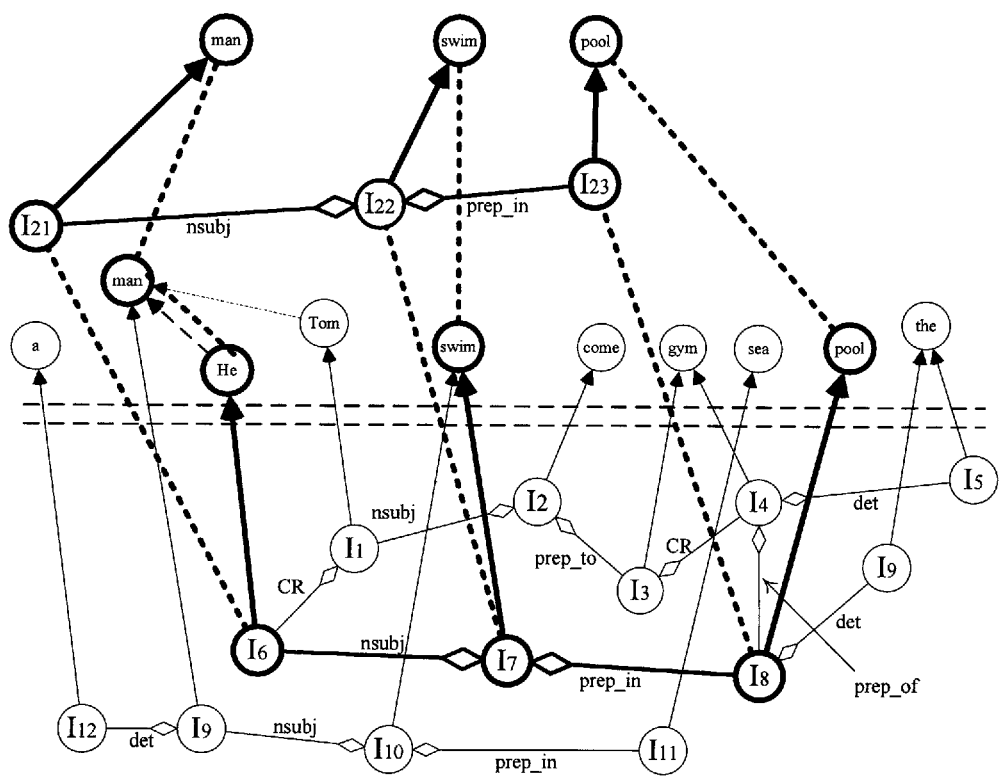
FIG. 6B is an illustration showing a third structure manipulation of the knowledge network in an embodiment of the graph matching process.
Figure 6C:
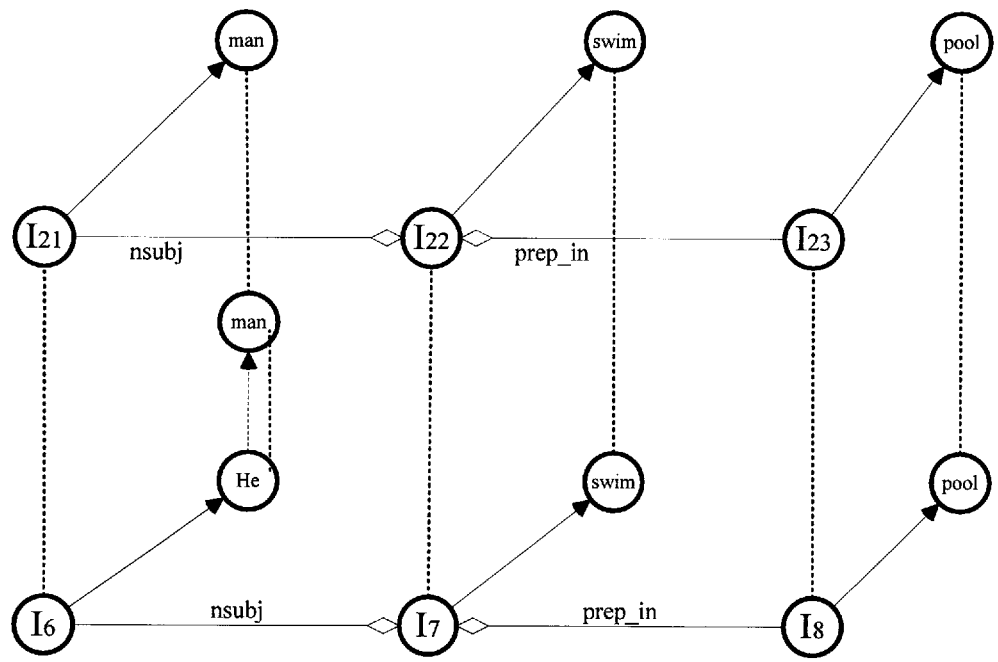
FIG. 6C is an illustration showing a fourth structure manipulation of the knowledge network in an embodiment of the graph matching process.

With reference to FIGS. 6A to 6C, there is illustrated an embodiment of a method for graph matching which is a method which is used to find a matching graph in the knowledge network or NLSKN based on a given graph pattern. This particular step of graph matching may be used by the system for processing natural language so as to find a matching sub-graph pattern within the knowledge network for the purposes of assessing the correctness of a natural language input which may have been parsed into a co-reference dependency graph or some other graph structure, or alternatively, the graph matching method can be used to locate matching sub-graph patterns within the network itself so as to identify correlations and relations between two previously separate graphs, but may indeed be related. A simple example illustrated the usage of the graph matching method is suppose there is two graph patterns within the knowledge network, with one graph pattern being "Tom has a car" whilst a second is "He has a sedan", then these two graph patterns can be effectively matched to each other thus on further processing such as by extending the set layer or instance layer of the knowledge network, a new relationship between "car" and "sedan" can be linked, and thus allow the knowledge network to learn more information with existing graph patterns.

In one example, the graph matching method operates by firstly using a given graph pattern G and a key node i0∈G, the process is to find matching graphs or matching sub-graphs G0, G1 . . . Gn in knowledge network or NLSKN G', Given a graph pattern G and a key node i0∈G, to find matching graph/sub-graphs G0, G1 . . . Gn in NLSKN G', the graph matching algorithm operates by using the given graph pattern G which includes an instance layer or a set layer with the similar structure of NLSKN and referenced to the word layer of G'. G can be a part of G'. In this example, the key node i0 is one of the nodes of the instance/set layer of G. Preferably, the key node is referenced to a verb, although other words or terms are possible.

Preferably, the graph matching algorithm can be used within the set layer, the instance layer or between the set layer and instance layer of the NLSKN or between a given graph pattern and the NLSKN.

In one example, the process of the graph matching method is used between a pair of relation $r_1(i_1,i_2)$ and $r_2(i_3,i_4)$ in the multiple layer knowledge network, where:

$I_1$ is the set of co-reference nodes of $i_1$;
$I_2$ is the set of co-reference nodes of $i_2$;
$I_3$ is the set of co-reference nodes of $i_3$;
$I_4$ is the set of co-reference nodes of $i_4$;
$W_1$ is the set of referenced words for all the nodes in $I_1$;
$W_2$ is the set of referenced words for all the nodes in $I_2$;
$W_3$ is the set of referenced words for all the nodes in $I_3$; and,
$W_4$ is the set of referenced words for all the nodes in $I_4$.

If four words $w_{1i} \in W_1$, $w_{2j} \in W_2$, $w_{3k} \in W_3$ and $w_{4l} \in W_4$ can be found that $w_{3k}$ is the same or hypernymy of $w_{1i}$ and $w_{4l}$ is the same or hypernymy of $w_{2j}$, the relation $r_2$ is considered as a matching relation of relation $r_1$.

The steps are as follows:

1, Get $i_0$ and all the co-reference (connected to $i_0$ by co-reference relation) instance nodes of $i_0$ as $i_0, i_1, i_2 \ldots i_n \in I$ as the key node set.
2, For each $i_j \in I$ (j=0, 1 . . . , n), find all the semantic/syntactic dependency relations as $r_{j1}(i_j, i_{rj1})$, $r_{j2}(i_j, i_{rj2}) \ldots r_{j1}(i_j, i_{rj1}) \in R_j$ and the connected nodes of these relations as $i_{rj1}, i_{rj2} \ldots i_{rj1} \in I_{rj}$. We define the union $R=R_0 \cup R_1 \cup R_2 \ldots \cup R_n$ and $I_r=I_{r0} \cup I_{r1} \cup I_{r2} \ldots \cup I_{rn}$.
3, find matching relations $r'_{jk1}, r'_{jk2}, \ldots r'_{jkt} \in R'_{jk}$, for each relation $r_{jk}(i_j,i_{rjk}) \in R$ (j=0, 1, 2, . . . , n, k=1, 2, . . . , l) and the connected node $i_{rjk} \in I_r$, $i_{rjk} \in I''_r$ if at least one matching relation of $r_{jk}$ can be found ($R'_{jk}$ is not empty). We define the union of all matching relations $R'=\Sigma \cup R'_{jk}$ (j=0, 1, 2, . . . , n, k=1, 2 . . . , l).
4, Connect the matching relations in R' which are share or co-referenced to the same nodes and matched by different relations in R to generate or extend one or more matching sub-graphs.
5, Repeat the steps 1-4 for each matched instance node $i_{rjk} \in I''_r$.

FIG. 6A to 6C show a simplify example of a method to find a matching sub-graph. Given a graph pattern [602(I)], to find matching sub-graphs in the NLSKN [602(II)]. Note that the key node (I22) is referenced to the verb "swim".

In this example:

1, Because there is no co-reference relation for I22, there is only one instance node I22 in the key node set.
2, The referenced word node for I22 is "swim".
3, The word node swim is referenced to two instance nodes I7 and I10.
4, For I7, two syntactic relations nsubj(I7, I6) and prep_in (I7, I8) are found. For I10, two syntactic relations nsubj(I10, I9) and prep_in(I10, I11) are found.
5, The found syntactic relations are compared to the syntactic relations nsubj(I22, I21) and prep_in(I22, I23) of I22. TYPE(nsubj(I7, I6))=TYPE(nsubj(I22, I21)), DIRECTION(nsubj(I7, I6))=DIRECTION (nsubj(I22, I21)). And the referenced word node he of I6 is a hypernymy of the referenced word node man of I21. The instance relation nsubj(I7, I6) is a matching instance relation of nsubj(I22, I21). Similarly, prep_in (I7, I8) is a matching instance relation of prep_in(I22, I23), nsubj(I10, I9) is a matching instance relation of nsubj(I22, I21).

However, when prep_in (I10, I11) is compared to prep_in (I22, I23). The referenced word node sea of I11 is different and not a hypernymy of the referenced word pool of I23. So prep_in(I10, I11) is not a matching instance relation of prep_in(I22, I23).

The matching instance nodes nsubj(I7, I6) and prep_in(I7, I8) compose to a matching graph. nsubj(I10, I9) is another matching sub-graph.

6, If the graph pattern 602(I) has more relations and nodes, repeat the step 1-5 until all these relations and nodes are processed.

Graph matching method forms the bases of the following methods for NLSKN. The rule conclusion method, the reasoning and imagination, the consistency examination method and the question/answer system are all arranged in some embodiments to use an embodiment of or are based on the graph matching method. The given graph pattern G includes a word layer and an instance/set layer with the same structure of NLSKN. G can be a separate graph pattern or a part of G'. The key node N is one of the nodes of the instance/set layer of G. The graph matching algorithm can be used within or between the set layer, instance layer of the NLSKN or between a given separate pattern and the NLSKN.

Mathematically, the process of the graph matching method includes the steps of:

1, Get $i_0$ and all the co-reference (connected to $i_0$ by co-reference relation) instance nodes of $i_0$ as $i_0, i_1, i_2 \ldots i_n \in I$ as the key node set.
2, For each $i_j \in I$ (j=0, 1 . . . , n), find all the semantic/syntactic dependency relations as $r_{j1}(i_j, i_{rj1})$, $r_{j2}(i_j, i_{rj2}) \ldots r_{j1}(i_j, i_{rj1}) \in R_j$ and the connected nodes of these relations as $i_{rj1}, i_{rj2} \ldots i_{rj1} \in I_{rj}$. We define the union $R=R_0 \cup R_1 \cup R_2 \ldots \cup R_n$ and $I_r=I_{r0} \cup I_{r1} \cup I_{r2} \ldots \cup I_{rn}$.
3, find matching relations $r'_{jk1}, r'_{jk2}, \ldots r'_{jkt} \in R'_{jk}$, for each relation $r_{jk}(i_j,i_{rjk}) \in R$ (j=0, 1, 2, . . . , n, k=1, 2, . . . , l) and the connected node $i_{rjk} \in I_r$, $i_{rjk} \in I''_r$ if at least one matching relation of $r_{jk}$ can be found ($R'_{jk}$ is not empty). We define the union of all matching relations $R'=\Sigma \cup R'_{jk}$ (j=0, 1, 2, . . . , n, k=1, 2 . . . , l).
4, Connect the matching relations in R' which are share or co-referenced to the same nodes and matched by different relations in R to generate or extend one or more matching sub-graphs.
5, Repeat the steps 1-4 for each matched instance node $i_{rjk} \in I''_r$.

Discover Graph Based Probabilistic Rules from the Knowledge in NLSKN

Figure 7A:
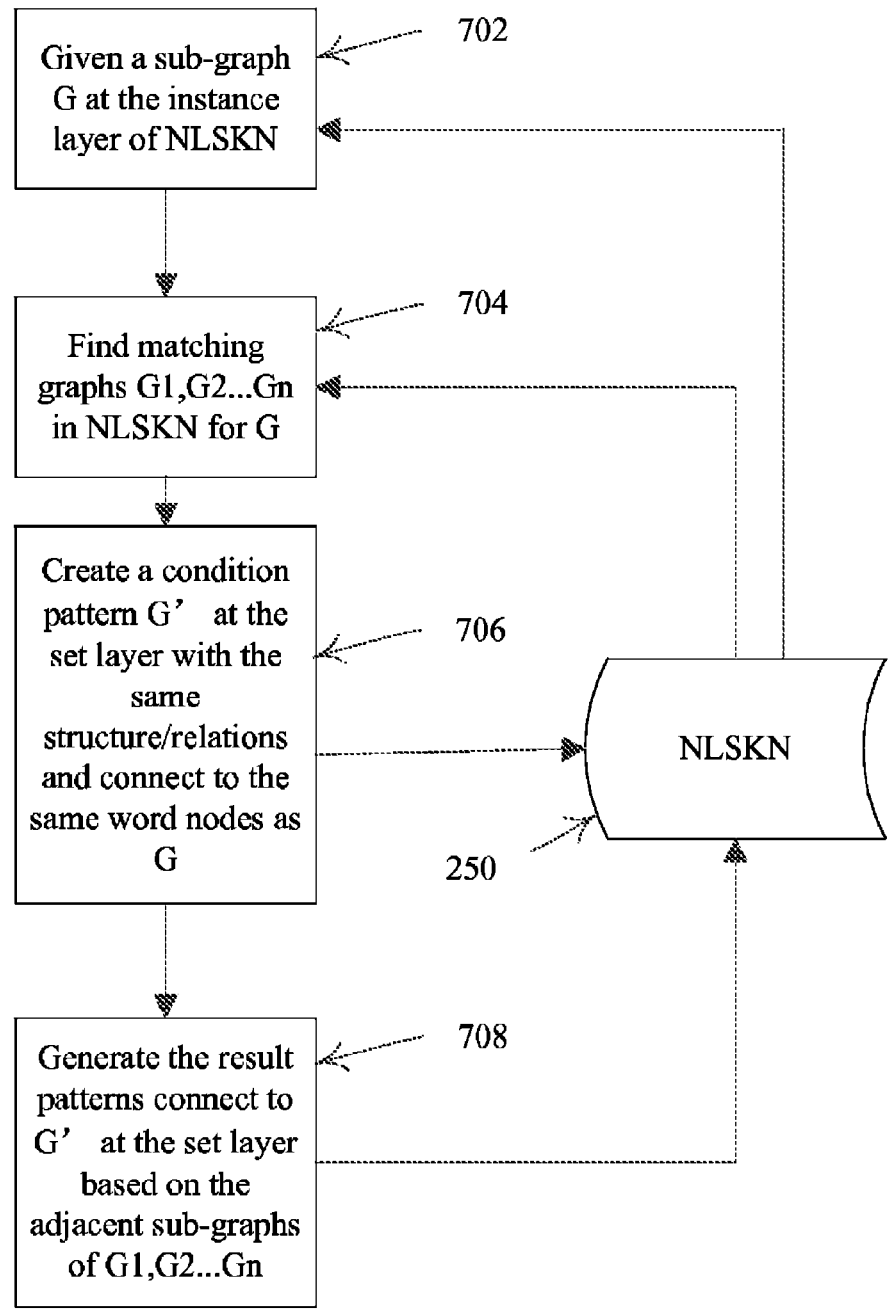
FIG. 7A is a flow chart showing an embodiment of the processes in generating a set layer of a knowledge network of FIG. 3.

With reference to FIG. 7A, there is illustrated a flow diagram illustrating the steps which are undertaken to build the set layer of the NLSKN by summing up the graph based probabilistic rules from the knowledge at the instance layer.

By using the supervised learning method, NLSKN is constructed with two layers including the word layer and the instance layer. After that, the set layer can be built by an induction method from the data of the instance layer based on the graph matching algorithm.

Given a graph pattern G (702), the system attempt to discover possible graph based probabilistic rules. The graph pattern can be a sub-graph of input content and can be part of the NLSKN with high activations.

At first, find matching graph G'1,G'2 . . . G'n for the given graph pattern G in the NLSKN G' (704). t>=0 is a given threshold. If n>t, select all the nodes in the instance layer of G and connected relations as G", copy G" to the set layer (706). For each instance node im∈G, and each semantic/syntactic relation r'mkl of the matching instance node i'mk of im, to find matching edges of r'mkl in the matching graphs G'1,G'2 . . . G'n. If p matching edges are found, copy r'mkl and the node on the other end i'mkl as r"mkl and i"mkl to the set level and connect to the corresponding set node i"m. Then set the probability of r"mkl as p/n. r"mkl and i"mkl are considered as the possible dependency relation and the possible set node. Similarly, find all the possible dependency relations and possible sets to connect to G". All these possible dependency relations and possible sets are considered as the result pattern G'"(706). Correspondingly G" is the condition pattern. The probabilistic rule Gr=G"UG'".

Figure 7B:
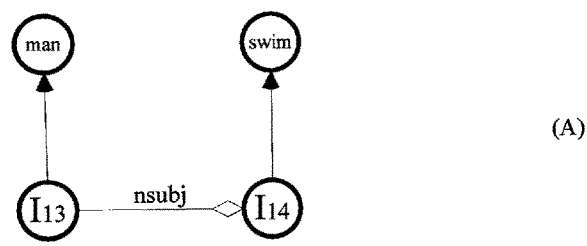
FIG. 7B(A) is an illustration to show the structural formation of a graph layer generated by the processes of FIG. 7A.
Figure 7B:
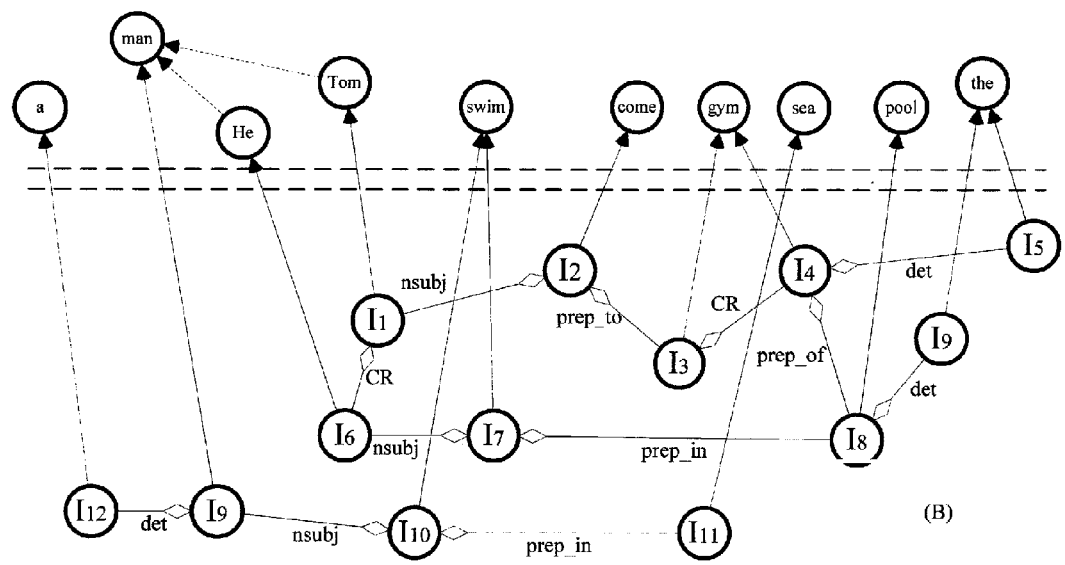
Figure 7B:
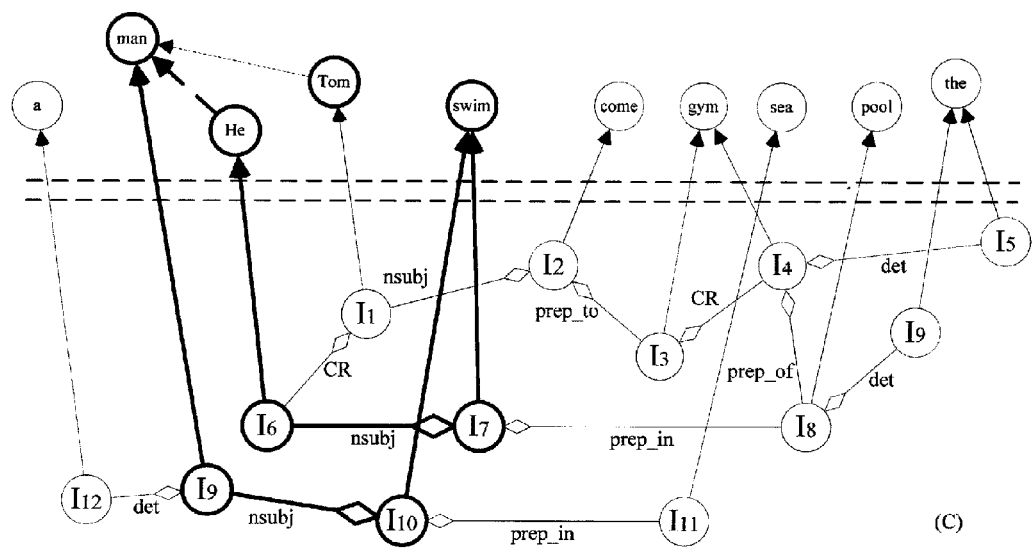
Figure 7C:
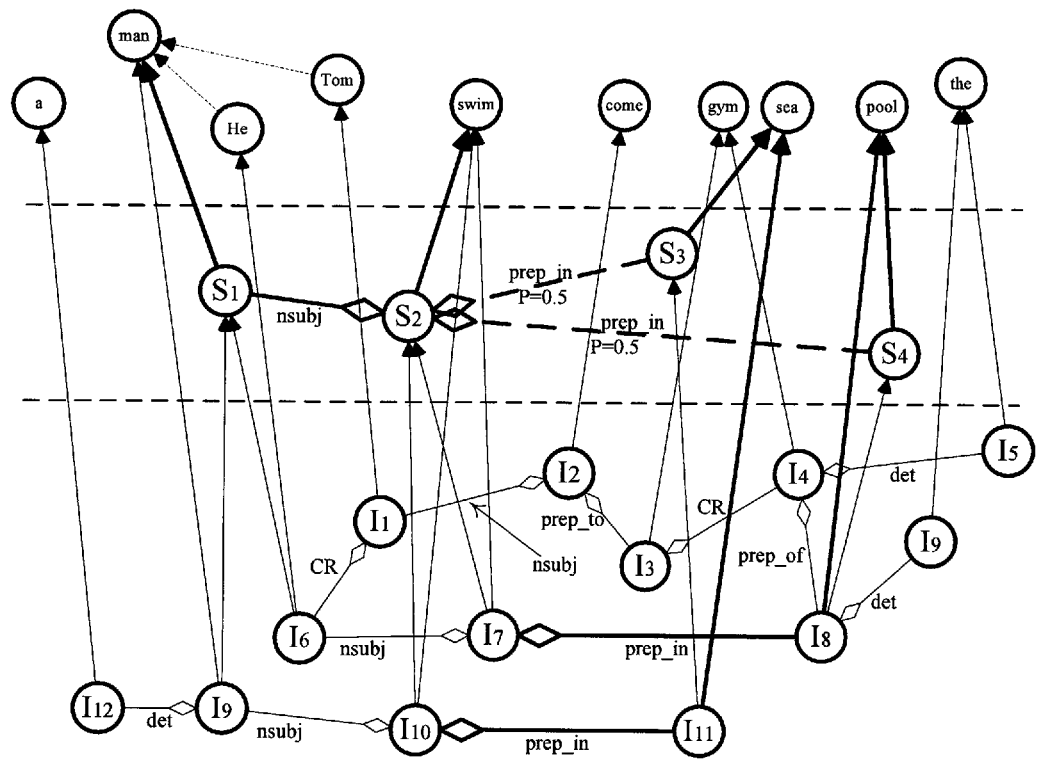
FIG. 7C is an illustration to show the structural formation of the set layer generated by the processes of FIG. 7A.

FIGS. 7B to 7C show an example of the induction process. FIG. 7B(A) is a given graph pattern G{man, swim, I13, I14}. FIG. 7B(B) is a part of a NLSKN G'. FIG. 7B(C) shows two matching graph of G as G'1{man,swim,I9,I10} and G'2{he, swim, I6, I7}. The instance node I14 of the graph pattern G has two matching node I10 and I7. Each of them has a prep_in dependency relation and corresponding instance node I11 and I8.

In FIG. 7C, the graph pattern G{man, swim, I13, I14} is copied and merge to the NLSKN. The instance nodes I13 and I14 are copied to the set layer as S1 and S2. prep_in(I10, I11) and prep_in(I7,I8) are also copied to the set layer as prep_in(S2,S3) and prep_in(S2,S4). Because in this example, as S3 is connected to the word sea and S4 is connected to a different word pool, each of them has only one sample in the surrounding areas of the two matching graphs G'1 and G'2. According, the probability of the possible dependency relation prep_in(I10, I11) and prep_in (I7,I8) are both ½=0.5. The (S) nodes and relations between the (S) nodes as shown in FIG. 7C include a graph based probabilistic rule for the NLSKN. The sub-graph {man, swim, S1, S2} is the condition pattern and sub-graphs {sea,S2,S3} and {pool, S2,S4} are the probabilistic results pattern.

Besides the graph based probabilistic rules, the superset/subset relation between nodes at the word layer can be discovered from the instance layer. For a pair of words W1 and W2, when the system finds the sub-graph like FIG. 7D(I) in NLSKN, a possible superset/subset relation is added between from W1 to W2 as in FIG. 7D(II).

Probabilistic Reasoning, Guess or Imagination

Figure 8A:
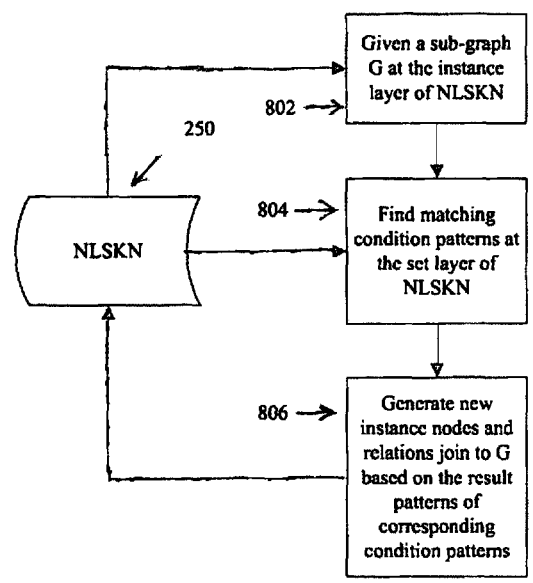
FIG. 8A is a flow chart showing an embodiment of the processes in generating new instance nodes into the instance layer of the knowledge network of FIG. 3.
Figure 8B:
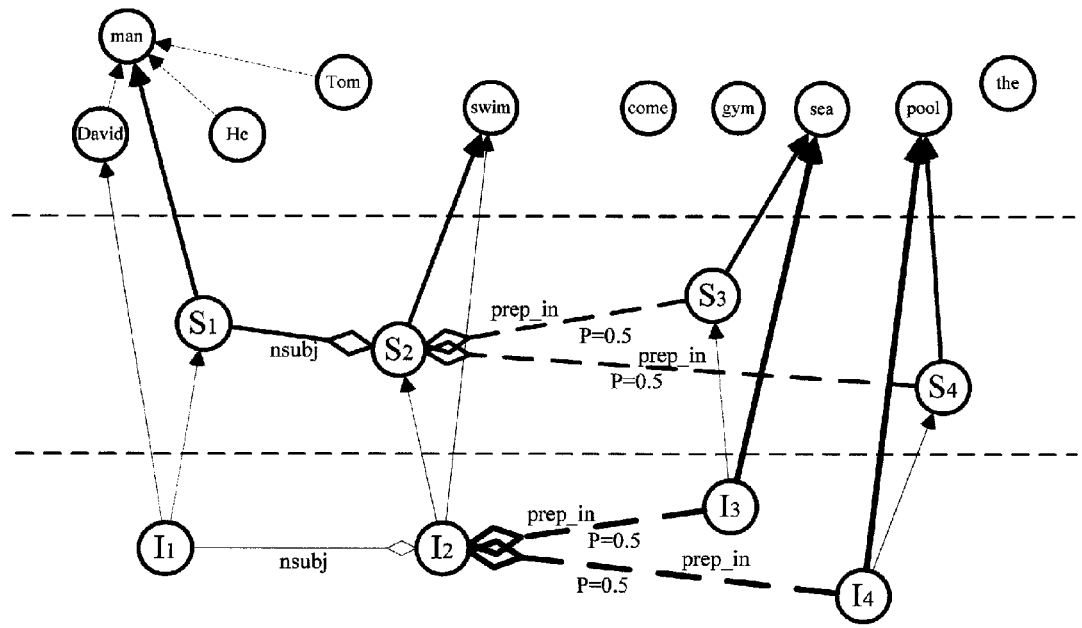
FIG. 8B is an illustration to show the structural manipulation to the knowledge network in accordance with the processes in generating new instance nodes of FIG. 8A.

With reference to FIGS. 8A and 8B, in this example embodiment, based on the probabilistic reasoning rules, the system can generate new knowledge from existing knowledge. In NLSKN G' 250, given a sub-graph G⊂G' (802), if G is a matching graph of a condition pattern G" of a graph based probabilistic rule R, G" ⊂ R (804), result pattern G'" ⊂R. G'" can be copied to instance layer to connect to the corresponding nodes of G. The copy of G'" is G1. G1 is the generated new knowledge (806). For each dependency relations r∈G1, if P(r)=1, and r is directly connected to a node of G or r is indirectly connected to a node of G through some dependency relations with the probabilities 1, r and the node directly connect to r is considered as the result of reasoning. All the other dependency relations and connected nodes in G1 which are not the result of reasoning are considered as the result of guess or imagination.

FIG. 8B shows an example of this process. Given G{David,Swim,I1,I2}. Based on the matching algorithm, G is a matching graph of the condition pattern G"{man,swim, S1,S2}. The result graph G'"{sea,pool,S2,S3,S4} is copied to the instance layer as G1{sea, pool, I2, I3, I4}. Because the probability of the dependency relation prep_in(I2,I3) is P(prep_in(I2,I3))=0.5, prep_in(I2,I3) is considered as an imagination or guess of G. Similarly, prep_in(I2,I4) is also considered as an imagination or guess of G.

The system keeps generating new knowledge by this method based on the existing knowledge in NLSKN when there is no input or query.

Spreading Activation and Pruning

Given a graph pattern G and a key node i0∈G, to find matching graph/sub-graphs G0, G1 . . . Gn in NLSKN G', Graph matching algorithm is a base of the following methods for NLSKN. The given graph pattern G includes an instance layer or a set layer with the similar structure of NLSKN and referenced to the word layer of G'. G can be a part of G'. The key node i0 is one of the nodes of the instance/set layer of G. Normally, the key node is referenced to a verb. The graph matching algorithm can be used within the set layer, the instance layer or between the set layer and instance layer of the NLSKN or between a given graph pattern and the NLSKN.

The process of the graph matching method includes the steps of:

1, Get $i_0$ and all the co-reference (connected to $i_0$ by co-reference relation) instance nodes of $i_0$ as $i_0, i_1, i_2 \ldots i_n \in I$ as the key node set.
2, For each $i_j \in I$ (j=0, 1 . . . , n), find all the semantic/syntactic dependency relations as $r_{j1}(i_j, i_{rj1})$, $r_{j2}(i_j, i_{rj2}) \ldots r_{jn}(i_j, i_{rj1}) \in R_j$ and the connected nodes of these relations as $i_{rj1}, i_{rj2} \ldots i_{rj1} \in I_{rj}$. We define the union $R = R_0 \cup R_1 \cup R_2 \ldots \cup R_n$ and $I_r = I_{r0} \cup I_{r1} \cup I_{r2} \ldots \cup I_{rn}$.
3, find matching relations $r'_{jk1}, r'_{jk2}, \ldots r'_{jkt} \in R'_{jk}$, and the connected node $i_{rjk} \in I_r$. $i_{rjk} \in I^m_r$ if at least one matching relation of $r_{jk}$ can be found ($R'_{jk}$ is not empty). We define the union of all matching relations $R' = \Sigma \cup R'_{jk}$ (j=0, 1, 2, . . . , n, k=1, 2 . . . , l).
4, Connect the matching relations in R' which are share or co-referenced to the same nodes and matched by different relations in R to generate or extend one or more matching sub-graphs.
5, Repeat the steps 1-4 for each matched instance node $i_{rjk} \in I^m_r$.

FIGS. 6A to 6C, as previously described above show a simple example to find a matching sub-graph. Given a graph pattern [602(I)], to find matching sub-graphs in the NLSKN [602(II)]. The key node is I22 referenced to the verb swim.

1, Because there is no co-reference relation for I22, there is only one instance node I22 in the key node set.
2, The referenced word node for I22 is swim.
3, The word node swim is referenced to two instance nodes I7 and I10
4, For I7, two syntactic relations nsubj(I7, I6) and prep_in (I7, I8) are found. For I10, two syntactic relations nsubj(I10, I9) and prep_in(I10, I11) are found.
5, The found syntactic relations are compared to the syntactic relations nsubj(I22, I21) and prep_in(I22, I23) of I22.

TYPE(nsubj(I7, I6))=TYPE(nsubj(I22, I21)), DIRECTION(nsubj(I7, I6))=DIRECTION (nsubj(I22, I21)). And the referenced word node he of I6 is a hypernymy of the referenced word node man of I21. The instance relation nsubj(I7, I6) is a matching instance relation of nsubj(I22, I21). Similarly, prep_in(I7, I8) is a matching instance relation of prep_in(I22, I23), nsubj(I10, I9) is a matching instance relation of nsubj(I22, I21).

However, when prep_in(I10, I11) is compared to prep_in (I22, I23). The referenced word node sea of I11 is different and not a hypernymy of the referenced word pool of I23. So prep_in(I10, I11) is not a matching instance relation of prep_in(I22, I23).

The matching instance nodes nsubj(I7, I6) and prep_in(I7, I8) compose to a matching graph. nsubj(I10, I9) is another matching sub-graph.

6, If the graph pattern [602(I)] has more relations and nodes, repeat the step 1-5 until all these relations and nodes are processed.

In some examples, the NLSKN can be very big. According, in some examples, a pruning method is necessary for graph matching. To facilitate this process, each set node or instance node in the NLSKN has an activation. Each time when a sub-graph at the instance layer of NLSKN is matched or a rule is satisfied, the activations of matching nodes are activated to a high level and spread to the linked nodes. The activations of all the nodes are decreased after a particular period such as per second or per minute. When the graph matching algorithm attempts to find matching graphs/sub-graphs for a given graph pattern G, the graph matching algorithm only finds a necessary number of matching graphs/sub-graphs with high activations.

Semantic Reasonability/Consistency Examination of Knowledge

Figure 9A:
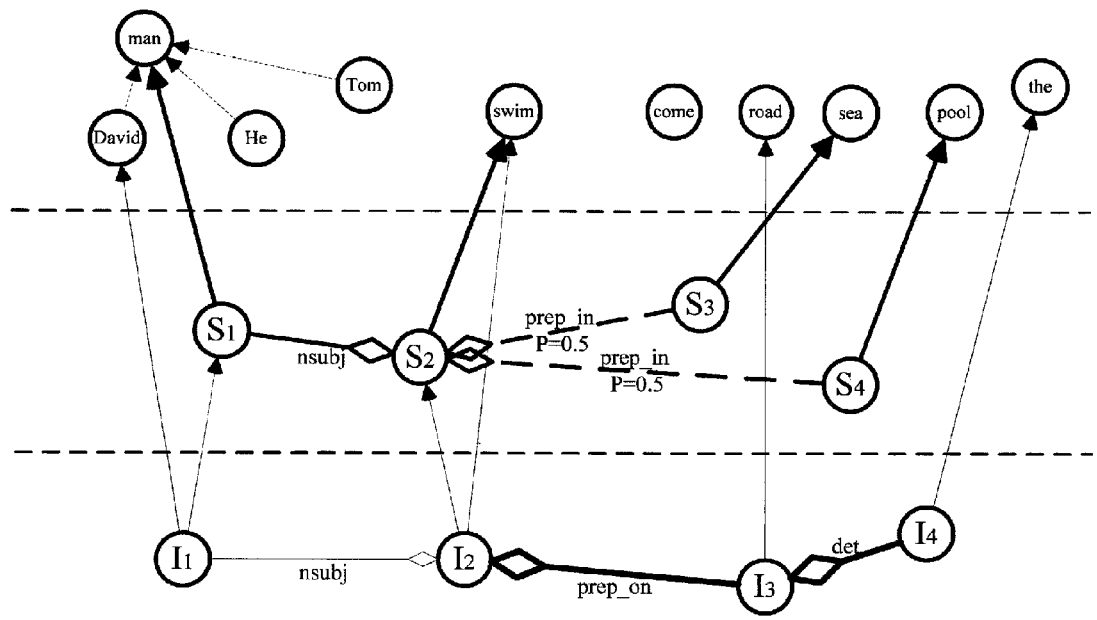
FIG. 9A is a flow chart showing an embodiment of the processes in finding conflicts in the knowledge network of FIG. 3.
Figure 9B:
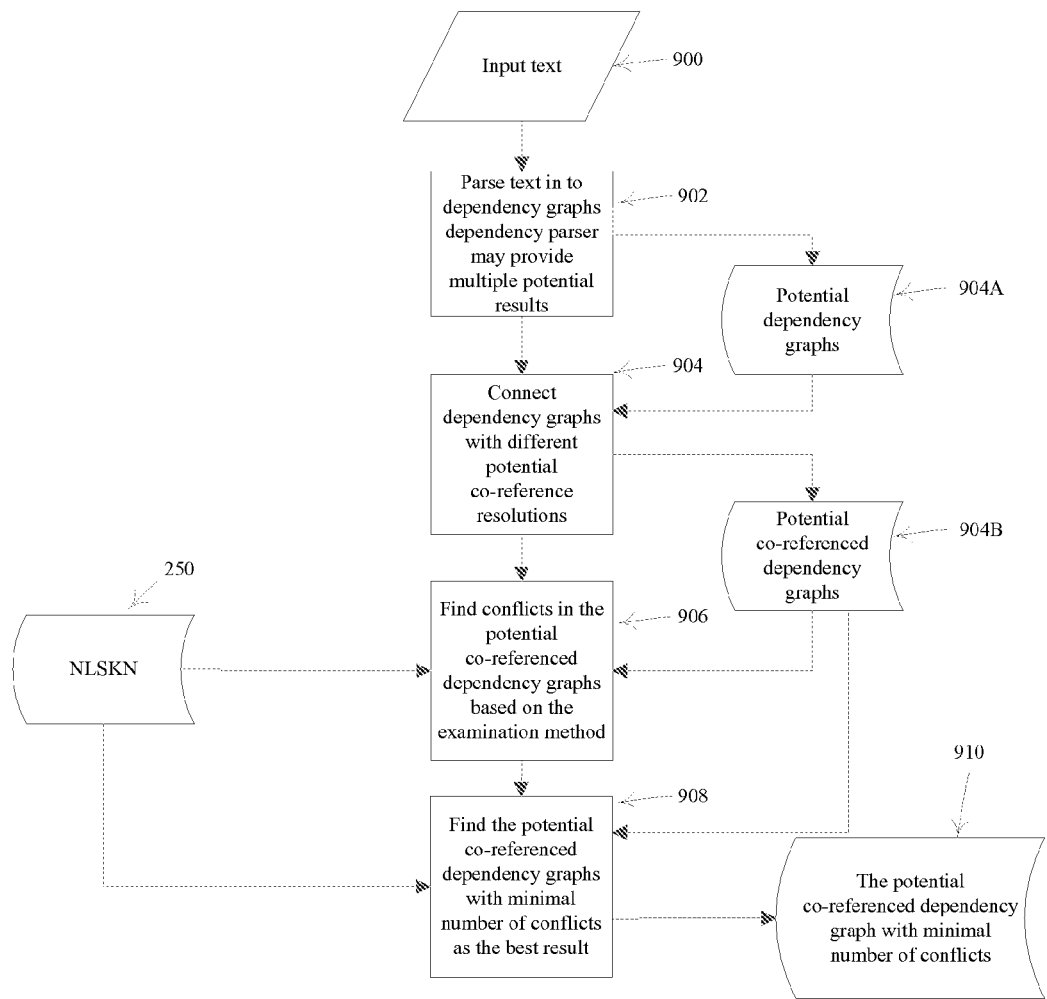
FIG. 9B is an illustration to show the structural manipulation of the knowledge network in accordance with the processes of FIG. 9A.

With reference to FIGS. 9A and 9B, there is illustrated the method in which the system can conduct an assessment of the reasonability or consistency of a natural language input. In these examples, any input knowledge or the knowledge represented by a sub-graph of the NLSKN can be examined to assess if the knowledge is reasonable and consistent with the other knowledge in NLSKN.

The steps in which this can be conducted may include, given a graph pattern G which represents the knowledge to be assessed or examined:

1, Find all the matching sub-graphs in the condition patterns of the rules at the set layer.
2, For each matching rule R', the condition pattern G" is a matching sub-graph of G. The sub-graph G1 of G is matched to G". Compare the connected dependency relations and nodes of the matched sub-graph G1, with the corresponding result patterns G'" of R'.
3, An instance semantic or syntactic relation between two instance nodes in the matching sub-graph is reported as a conflict if it is not matched to a secondary semantic or syntactic relation in the result pattern when comparing each instance semantic or syntactic relations and instance nodes directly connected to each matching sub-graphs to the result pattern of the matched graph based probabilistic rule. The conflict shows the semantic or syntactic relation is considered unreasonable or inconsistent to the existing knowledge of NLSKN.
4, If a relation R1∈G is not a part of any sub-graph Gi of G that Gi can be matched to a condition pattern, R1 is reported as a conflict because lack of knowledge.
5, if there is no conflict, add the reasoning or guess/imagination results to extend G as Ge, and repeat from step 1 for the extended Ge. The repeat times are limited by time or a temp memory space for this task. If no conflict is found until the repeat times or the temp memory space reach the limitation, the knowledge of G is considered as reasonable and consistent to the existing knowledge of NLSKN.

This reasonability/consistency examination method may not be completed because of the limitation of the time and memory space consuming. It is possible to ignore some conflicts. In the NLSKN, each rule has a matching number which shows how many matching graphs can be found at the instance layer for the condition pattern of the rule. To reduce the computing time, the examination only considers the rules built manually or the rules with high matching numbers.

In the examination process, some equivalent or approximate methods may be used, for example: given a graph pattern G and an additional relation R and the connected instance node i that r is connected to G. G∪i∪r=G+. The system finds matching graphs in NLSKN G' for G. The number of matching graphs is M(G). Similarly, find matching graphs in NLSKN G' for G+. The number of matching graphs is M(G+). A conflict for the relation r is reported if M(G+)/M(G)=0, and M(G)>t, t is the threshold. When the graph matching is limited by pruning based on activations, this method is an approximate method of the examination method based on probabilistic rules at the set layer.

As is the case in Natural Language, the context of the Natural Language input may be important in ascertaining whether an input is correct or make sense. Accordingly, in some special contexts, the rules may be different from common sense. For example, in a fantasy fiction context, a man may fly. However, in common sense, a man can not fly. When the system attempts to understand the fantasy fiction, some localizing rules may be needed. Normally, the localizing rules are not stored in NLSKN permanently and thus in the examination process, the system may discover localizing temporary graph based probabilistic rules in the knowledge limited by activations or particular input data source.

FIG. 9A shows an example of conflict. The sub-graph G{David,swim,the,road,I1,I2,I3,I4} represents the new input knowledge "David swam on the road.". The sub-graph G1{David,swim,I1,I2} is a matching graph of the condition pattern G"{man,swim,S1,S2} of the rule R{man,swim,sea,pool,S1,S2,S3,S4}. However, prep_on(I2,I3) is not a matching sub-graph of the result pattern G'"{S2,S3,S4}. So prep_on(I2,I3) is a conflict to the existing knowledge of NLSKN G'. And the new input knowledge "David swam on the road." is considered as unreasonable or inconsistent to the NLSKN.

Semantic reasonability/consistency examination can be used to improve the performance of dependency parsing and co-reference resolution. FIG. 9B shows the process to find the most reasonable co-referenced dependency graph within multiple potential co-referenced dependency graphs for an input text.

At first, the input text (900) is parsed by a dependency parser into a set of potential results Gp={G1 ... G2 ... Gn}. Each potential result Gi contains one or more dependency graphs (902).

Then a set of potential co-reference results Rp={R1, R2 ... Rm} are generated by a co-reference resolution system. Each potential co-reference result Rj (904A) contains all the co-referenced word pairs in the input text.

For each Gi and Rj, the dependency graphs in Gi are connected by the co-reference relations based on the co-reference word pair in Rj. n*m potential co-referenced dependency graphs (904B) DG={DG11, DG12, ... DGnm} based on the combination of Gp and Rp are generated (904).

Each potential co-referenced dependency graph DGij in DG is examined by the consistency examination algorithm to generate a conflict number (906).

The potential co-referenced dependency graph DGij with the minimal conflict number (910) is considered as the best understanding for the input text (908).

As the precision of dependency parser is not 100%. There are likely to be mistakes in the results of dependency parser. Similarly, there are always mistakes in the results of co-reference resolution. Most of existing dependency parsers base on syntactic analysis, semantic feature is not considered. Similarly, most of co-reference resolution systems do not consider the semantic feature too. The automatically generated co-referenced dependency graphs always have mistakes. The consistency examination can help to find the semantic conflicts in the co-referenced dependency graphs based on the knowledge in NLSKN. Some dependency parsers and co-reference resolution systems can provide multiple potential results or intermediate results. Eliminating the co-referenced dependency graphs with more conflicts in the potential results may help to improve the quality of dependency parsing or co-reference resolution if the conflicts finding is in high precision.

The conflict finding depends on the knowledge in NLSKN. When the system attempts to examine a co-referenced dependency graph, many relations in the co-referenced dependency graph are considered as conflicts if the knowledge in NLSKN is not enough. Because these relations can not be matched by any existing condition pattern of the probabilistic rules. This phenomenon can be used to test if the system can understand an input natural language text. Based on the examination, we propose an active learning method below.

Active Learning Based on NLSKN and the Rules

As supervised learning can be expensive, when the NLSKN stores a set of general knowledge, the active learning can be practiced. The system attempts to learn knowledge from natural language materials.

Figure 10:
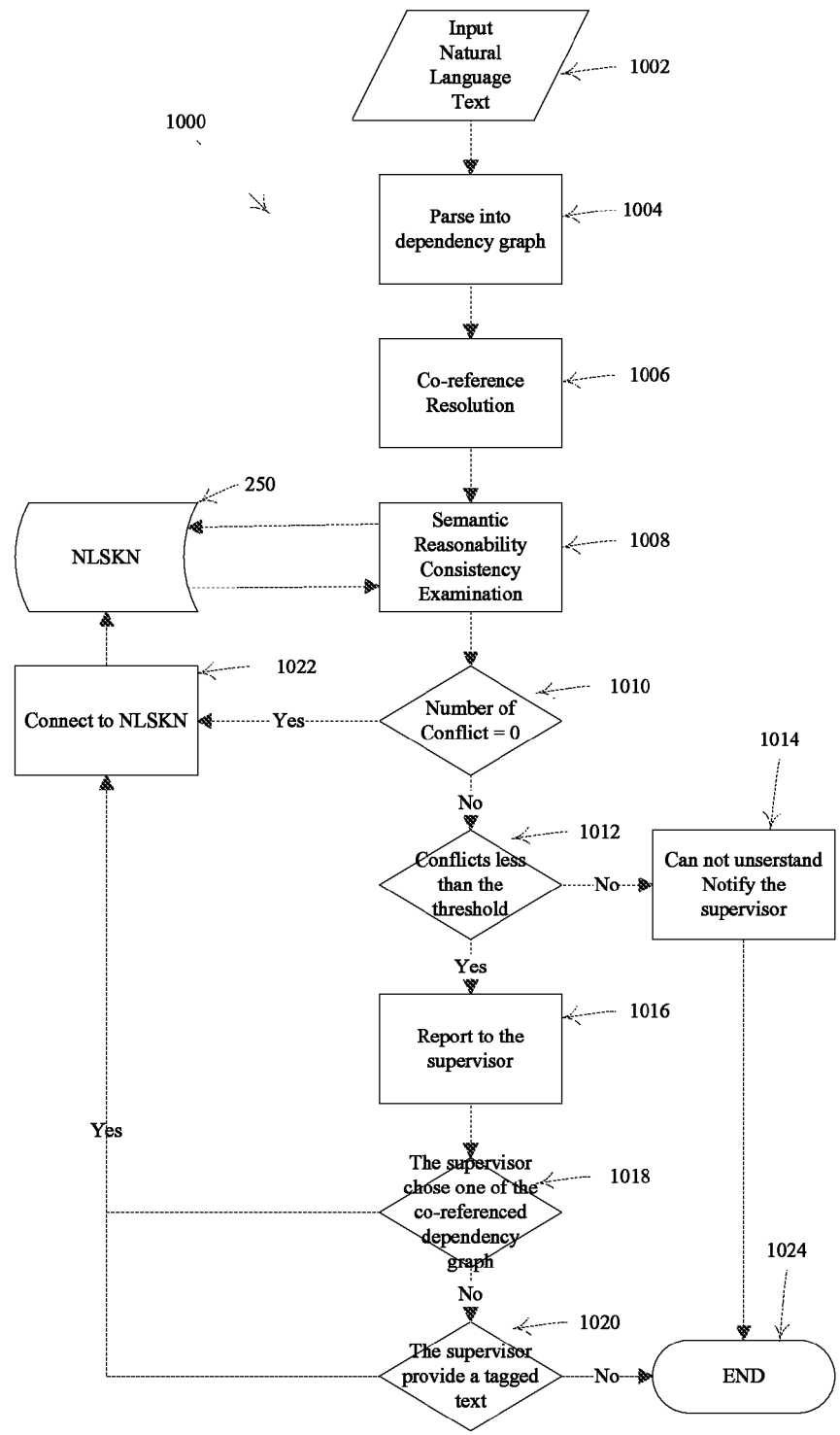
FIG. 10 is a flow chart showing an embodiment of the processes in a system for active learning in accordance with one embodiment of the present invention; and, FIG. 11 is a flow chart showing an embodiment of the processes in a system for processing natural language queries in accordance with one embodiment of the present invention.

Referring to FIG. 10, the active learning process 1000 includes a dependency parser module 1004 and a co-reference resolution module 1006 to parse the input text into potential co-referenced dependency graphs, a consistency examination module 1008 to find the semantic conflict in the potential co-referenced dependency graphs based on the knowledge in NLSKN, a module 1016 to show the potential co-referenced dependency graphs to the supervisor, an interface 1018 to getting the manual co-reference tags from the supervisor, and a process to append a co-reference dependency graph to NLSKN 1022.

1, The system parse a given natural language text T into dependency graphs by a dependency parser 1004. Connect the dependency graphs with co-reference relation as dependency graph patterns by a co-reference resolution system 1006. The dependency parser and the co-reference resolution tools need to be able to provide multiple potential results.

2, Use the semantic reasonability/consistency examination method 1008 to check all the potential dependency graph patterns. Find a potential dependency graph pattern with no conflict as G0, or several potential dependency graph patterns with minimal conflicts as G1, G2 . . . Gn.

3, If a G0 without conflict can be found 1010, connect G0 to NLSKN by the method same to the supervised learning 1022.

4, If a G0 without conflict can not be found, but potential dependency graph patterns G1, G2 . . . Gn are found that the number of conflicts in each of the graph patterns is smaller than a given threshold 1012, the text is recognized as potentially readable. The system will show the graph patterns 1016 to the supervisor to chose the correct understanding 1018 or provide a tagged text to solve the conflict 1020. If the supervisor chooses a correct understanding, connect the corresponding graph pattern to NLSKN, similar to the step 3 1022. If the supervisor provides a tagged text T', T' can be learnt by the supervised learning method 1022. If the supervisor does not choose a correct understanding or provide a tagged text, the text T is considered as not readable based on existing knowledge 1024.

5, If no any potential dependency graph pattern can be found with conflicts less than the threshold, ignore the input text T. The system notifies the supervisor that the knowledge in the text T can not be understood based on the existing knowledge at this stage 1014.

The active learning method attempts to choose the training materials automatically to reduce the cost of supervising. It is based on the consistency examination method and the existing knowledge in NLSKN.

The better quantity and quality of existing knowledge leads to better learning. If a co-referenced dependency graph is examined without any conflict found, it shows that based on existing knowledge in NLSKN the co-referenced dependency graph is reasonable. This co-referenced dependency graph can be learnt directly. Based on the number of the conflicts, a score is generated. If the score is same or higher than a threshold due to the enormous number of the founded conflicts, it shows that the co-referenced dependency graph can not be understood based on the existing knowledge in NLSKN. The co-referenced dependency graph will be ignored or reserved for future learning. If the score is lower than the threshold due to a few number of the founded conflicts, the system will ask the supervisor for additional supervising. The co-referenced dependency graph is considered understandable but there are some problems.

Only when the system asks for an additional supervising, the supervisor is needed to work. It reduces the working load of the supervisor. For the reasonable co-referenced dependency graphs without conflicts, the system can learn automatically.

Because the active learning method can sort the input natural language materials as understandable, questioning and not understandable, the supervisor may re-arrange the natural language materials in the training set based on the feedback of the active learning method to help the system achieve better learning.

The examination process attempt to guarantee all the knowledge in NLSKN is consistent to each others. Because the probabilistic rules are approximately correct and the reasoning is limited by the pruning, the consistency is approximate. With more and more knowledge being added to NLSKN, the probabilistic rules are updated and new conflicts may be found. The system will ask for additional supervising when internal conflicts are found.

Question and Answer Based on NLSKN

Based on the existing knowledge which may be stored in the knowledge network, the NLSKN system may be arranged to answer natural language question inputted by a user or other natural language sources.

Figure 11:
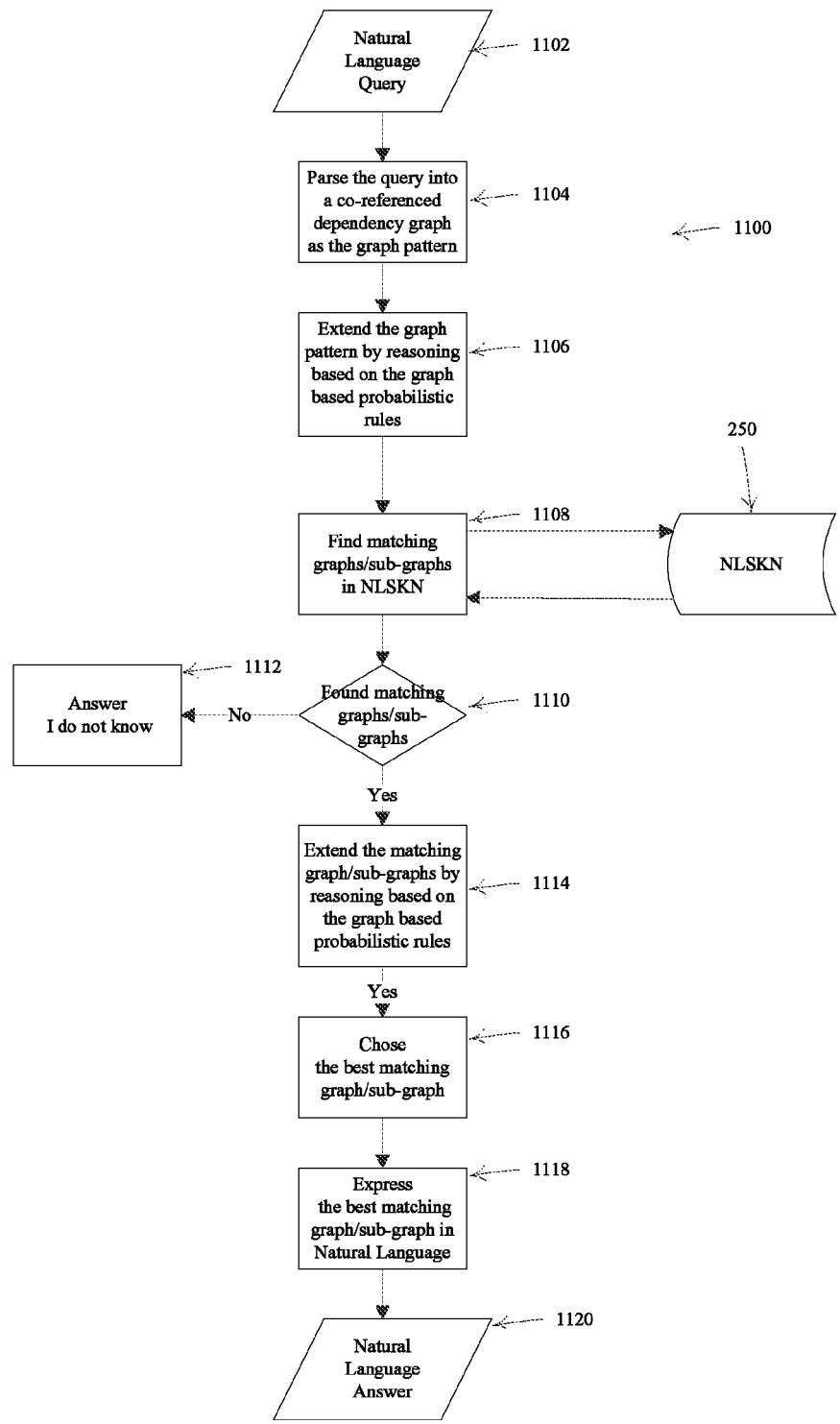

Referring to FIG. 11, the question/answer module 1100 includes a dependency parser 1104 and a co-reference resolution system 1106 to generate a co-referenced dependency graph from the input natural language question 1102, a reasoning module 1106 to extend the co-referenced dependency graph of the question, a graph matching module 1108 to find matching graphs/sub-graphs in NLSKN 250, a reasoning/imagination module 1114 to extend the found matching graphs/sub-graphs, an evaluation module 1116 to calculate a score for each extended matching graph/sub-graph and choose the best extended matching graph/sub-graph, and an expression module 1118 to express the best extended matching graph in natural language 1120.

The process is as below:
1. Parse the given natural language question 1102 into a co-referenced dependency graph as the graph pattern G 1104.
2. Extend the graph pattern G as Ge by the reasoning algorithm based on the graph based probabilistic rules 1106. Because there are different ways to express a single meaning, the reasoning process may find some equivalent graph patterns for the question. With these equivalent graph patterns, more matching graphs/sub-graphs can be found related to the question.
3. Use the graph matching algorithm to find matching graphs/sub-graphs in NLSKN G' for Ge as G'1, G'2 . . . G'n 1108. Each matching graph/sub-graphs corresponds to a potential answer for the question.
4. Extend the matching graphs/sub-graphs G'1,G'2 . . . G'n as Ge'1, Ge'2 . . . Ge'n by the reasoning algorithm based on the graph based probabilistic rules 1114. Some matching sub-graphs may only include related knowledge about the question, and the extended part of it may include the content that expected by the question. Before evaluating the matching graphs/sub-graphs, they are extended to discover more content related to the question.
5. Rematch the extended graph pattern of the question to each extended matching graph/sub-graph. Generate a score for each extended matching graph/sub-graphs based on the size and words of the rematching part of it. Choose the best matching graph G'i with the highest score in G'1,G'2 . . . G'n 1116.
6. express G'i in natural language to be the answer for the question 1118.
7. If there is no matching graph/sub-graph can be found 1110, the answer is "I don't know" 1112

The question is processed into a co-referenced dependency graph by a dependency parser and co-reference resolution system. The co-referenced dependency graph is considered a graph pattern to find matching sub-graphs in NLSKN. Before the graph matching step, the graph pattern is extended by reasoning based on the graph based probabilistic rules. In natural language, a single meaning can be expressed in different ways. The extended graph pattern may include different semantic or syntactic structures to represent the same meaning of the question.

Then the system find matching sub-graphs in the instance layer of NLSKN for the extended graph pattern. All these matching sub-graphs are related to the question. All these matching sub-graphs are extended by reasoning or imagination based on the graph based probabilistic rules. The extended matching sub-graphs may include different expressions or additional knowledge which is not discovered before.

After that, the system rematches the extended graph pattern and the extended matching sub-graph to get updated matching sub-graphs. Most of these matching sub-graphs may be approximate results. Evaluate each of them to generate a score. Express the best updated matching sub-graph in natural language as the answer. The expression of the matching sub-graph may be composed by the original input natural language sentences to build parts of the matching sub-graph or some automatically generated natural language sentences based on some predefined graph-to-text patterns.

These question/answer method has chance to find the answers in different expression or to discover the answer in hidden knowledge.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for processing natural language comprising the steps of:
   generating a first layer of a multi-layer knowledge network as a first data structure in computing storage, wherein the first layer of the multi-layer knowledge network includes a plurality of memory accessible word nodes each arranged to represent a word or an entity name;
   generating a second layer of the multi-layer knowledge network with a natural language dataset as a second data structure in computing storage, wherein the second layer comprises one or more memory accessible instance nodes each arranged to represent a word or an entity of the natural language dataset and, wherein each of the one or more instance nodes are linked by one or more semantic or syntactic relations to form one or more sub-graphs; and,
   referencing the first layer of the multi-layer knowledge network with the second layer of the multi-layer knowledge network to form an accessible natural language referencing dataset arranged to be accessed for comparison during the processing of a natural language input by establishing a direct memory reference between each of the word nodes and each of the instance nodes when upon it is determined that the word or the entity name represented by each word node is associated with the word or the entity represented by the instance node such that each of the plurality of word nodes is directly linked to at least one of the one or more sub-graphs through an associated instance node.

2. A method for processing natural language in accordance with claim 1 further comprising the step of: generating a third layer of the multi-layer knowledge network as a third data structure in computing storage comprising one or more graph based probabilistic rules.

3. A method for processing natural language in accordance with claim 2, wherein the one or more graph based probabilistic rules include a condition pattern.

4. A method for processing natural language in accordance with claim 3, wherein the one or more graph based probabilistic rules further include a result pattern.

5. A method for processing natural language in accordance with claim 2, wherein the third layer of the multi-layer knowledge network is connected to the first layer.

6. A method for processing natural language in accordance with claim 5, further comprising the step of: referencing each of the one or more probabilistic rules to the one or more word nodes of the first layer.

7. A method for processing natural language in accordance with claim 6, further comprising the step of establishing one or more secondary set nodes to reference each connected instance node of each of the connected one or more matching sub-graphs.

8. A method for processing natural language in accordance with claim 2, wherein the second layer is extended with the one or more probabilistic rules.

9. A method for processing natural language in accordance with claim 8, wherein the step of extending the second layer with the one or more probabilistic rules includes the steps of:
selecting a starting sub-graph in the second layer;
comparing the starting sub-graph with the one or more probabilistic rules to determine one or more matching one or more probabilistic rules; and
for each of the one or more matched probabilistic rules, identify the one or more secondary syntactic or semantic relationships, one or more secondary set nodes or one or more tertiary syntactic or semantic relations connected to the matching one or more probabilistic rules and inherit the one or more secondary syntactic or semantic relationships, one or more secondary set nodes or one or more tertiary syntactic or semantic relationships to the starting sub-graph.

10. A method for processing natural language in accordance with claim 9, wherein the one or more probabilistic rules include one or more sub-graphs having primary set nodes and primary semantic or syntactic relations which are compared with the starting sub-graph.

11. A method for processing natural language in accordance with claim 9, wherein the step of inheriting the one or more secondary syntactic or semantic relationships, one or more secondary set nodes or one or more tertiary syntactic or semantic relationships to the starting sub-graph includes referencing the one or more connected instance nodes referenced by the one or more secondary set node to the instance node of the starting sub-graph.

12. A method for processing natural language in accordance with claim 1, wherein the plurality of word nodes includes one or more semantic relations between each of the plurality of word nodes.

13. A method for processing natural language in accordance with claim 12, wherein a lexical database is processed to generate the first layer of the multi-layer knowledge network by referencing one or more synsets for each word in the lexical database with each word within the lexical database to form a plurality of inter-referenced word nodes each representative of a word and one or more synsets associated with the word.

14. A method for processing natural language in accordance with claim 13, wherein the plurality of inter-reference word nodes are inter-referenced by one or more semantic relationships between the plurality of word nodes.

15. A method for processing natural language in accordance with claim 14, wherein the plurality of inter-reference word nodes are further inter-referenced by one or more possible semantic relationships between the plurality of word nodes.

16. A method for processing natural language in accordance with claim 15, wherein the one or more semantic relationships or the one or more possible semantic relationships are inherited from semantic relations between the synsets of the lexical database.

17. A method for processing natural language in accordance with claim 16, wherein the lexical database is WordNet.

18. A method for processing natural language query comprising the steps of:
parsing the natural language query to generate a co-referenced dependency graph as a graph pattern data structure stored in computing storage, with the data structure being used to represent the natural language query;
performing a query with the graph pattern data structure to find matching sub-graphs for the graph pattern data structure within a second layer of a multi-layer knowledge network stored as an accessible natural language referencing dataset in computing storage; wherein the second layer of the multi data structure comprises one or more memory accessible instance nodes each arranged to represent a word or an entity of the natural language dataset and, wherein each of the one or more instance nodes are linked by one or more semantic or syntactic relations to form one or more sub-graphs;
generating a first layer of the multi-layer knowledge network, wherein the first layer of the multi-layer knowledge network includes a plurality of word nodes each arranged to represent a word or an entity name;
referencing the first layer of the multi-layer knowledge network with the second layer of the multi-layer knowledge network to form the accessible natural language referencing dataset arranged to be accessed for comparison during the processing of a natural language input by establishing a direct memory reference between each of the word nodes and each of the instance nodes when upon it is determined that the word or the entity name represented by each word node is associated with the word or the entity represented by the instance node, such that each of the plurality of word nodes is directly linked to at least one of the one or more sub-graphs through an associated instance node;
determining a score for each matching sub-graph and selecting the matching sub-graph which has the maximum score; and
processing the selected matching sub-graph to generate an answer in natural language.

19. A method for processing natural language query in accordance with claim 18 further comprising the steps of:

generating a third layer of the multi-layer knowledge network as a third data structure in computing storage comprising one or more graph based probabilistic rules, and before finding the matching sub-graphs, extending the second layer with the one or more probabilistic rules through the steps of:

selecting a starting sub-graph in the second layer;

comparing the starting sub-graph with the one or more probabilistic rules to determine one or more matching one or more probabilistic rules; and for each of the one or more matched probabilistic rules, identifying the one or more secondary syntactic or semantic relationships, one or more secondary set nodes or one or more tertiary syntactic or semantic relations connected to the matching one or more probabilistic rules and inheriting the one or more secondary syntactic or semantic relationships, one or more secondary set nodes or one or more tertiary syntactic or semantic relationships to the starting sub-graph; and removing the extended semantic or syntactic relations with a probability value lower than a predetermined threshold from the extended graph pattern.

20. A method for processing natural language query in accordance with claim 19, wherein the graph pattern is extended based on the graph based probabilistic rules.

21. A method for processing natural language query in accordance with claim 20, further comprising the step of calculating the score based on the matched words, relations and the probabilities of the relations for each particular matching sub-graph.

22. A method for processing natural language query in accordance with claim 21, wherein the step of calculating the score includes the steps of:

extending the found matching sub-graphs by the graph based probabilistic rules;

rematching the extended matching sub-graphs; and, calculate the score based on the extended matching sub-graphs.

23. A system for processing natural language comprising:

a first knowledge network module arranged to generate a first layer of a multi-layer knowledge network as a first data structure in computing storage, wherein the first layer of the multi-layer knowledge network includes a plurality of memory accessible word nodes each arranged to represent a word or an entity name;

a second knowledge network module arranged to generate a second layer of the multi-layer knowledge network with a natural language dataset as a second data structure in computing storage, wherein the second layer comprises one or more memory accessible instance nodes each arranged to represent a word or an entity of the natural language dataset and, wherein each of the one or more instance nodes are linked by one or more semantic or syntactic relations to form one or more sub-graphs; and, a processor arranged to reference the first layer of the multi-layer knowledge network with the second layer of the multi-layer knowledge network to form an accessible natural language referencing dataset arranged to be accessed for comparison during the processing of a natural language input by establishing a direct memory reference between each of the word nodes and each of the instance nodes when upon it is determined that the word or the entity name represented by each word node is associated with the word or the entity represented by the instance node such that each of the plurality of word nodes is directly linked to at least one of the one or more sub-graphs through an associated instance node.

24. A system for processing natural language in accordance with claim 23 further comprises: a third knowledge network module arranged to generate a third layer of the multi-layer knowledge network as a third data structure in computing storage comprising one or more graph based probabilistic rules.

25. A system for processing natural language in accordance with claim 24, where in the one or more graph based probabilistic rules include a condition pattern.

26. A system for processing natural language in accordance with claim 25, where in the one or more graph based probabilistic rules further include a result pattern.

27. A system for processing natural language in accordance with claim 26, wherein the third layer of the multi-layer knowledge network is connected to the first layer.

28. A system for processing natural language in accordance with claim 24, wherein the second layer is extended with the one or more probabilistic rules.

29. A system for processing natural language in accordance with claim 28, wherein the second layer is extended with the one or more probabilistic rules by a processor arranged to select a starting sub-graph in the second layer;

compare the starting sub-graph with the one or more probabilistic rules to determine one or more matching one or more probabilistic rules; and for each of the one or more matched probabilistic rules, identify the one or more secondary syntactic or semantic relationships, one or more secondary set nodes or one or more tertiary syntactic or semantic relations connected to the matching one or more probabilistic rules and inherit the one or more secondary syntactic or semantic relationships, one or more secondary set nodes or one or more tertiary syntactic or semantic relationships to the starting sub-graph.

30. A system for processing natural language in accordance with claim 23, wherein the plurality of word nodes includes one or more semantic relations between each of the plurality of word nodes.

31. A system in accordance with claim 23, further comprising:

a parser having a co-reference resolution system arranged to parse a plurality of natural language inputs into a plurality of co-referenced dependency graphs, wherein each of the plurality of co-referenced dependency graphs is associated with each of the plurality of natural language inputs; and a conflict check module arranged to determine a correct result or a conflicting result associated with each of the plurality of natural language inputs by processing each of the co-referenced dependency graphs.

32. A system in accordance with claim 23, further comprising:

a parser arranged to parse the natural language query to generate a co-referenced dependency graph as a graph pattern to represent the natural language query;

a graph matching module arranged to find matching sub-graphs for the graph pattern within a second layer of a multi-layer knowledge network;

an assessing module arranged to determine a score for each matching sub-graph and selecting the matching sub-graph having the maximum score; and a processor arranged to process the selected matching sub-graph to generate an answer in natural language.

33. A system for processing a natural language input including:
- a parsing module arranged to generate a co-referenced dependency graph in a data structure in computing storage with the natural language input, wherein the co-referenced dependency graph is arranged to represent each word of the natural language input and one or more semantic or syntactic relations between each word;
- a processor arranged to search a multi-layer knowledge network with the co-referenced dependency graph to identifying one or more probabilistic rules, the multi-layer knowledge network generated through the method comprising the steps of:
- generating a first layer of a multi-layer knowledge network as a first data structure in computing storage, wherein the first layer of the multi-layer knowledge network includes a plurality of memory accessible word nodes each arranged to represent a word or an entity name;
- generating a second layer of the multi-layer knowledge network with a natural language dataset as a second data structure in computing storage, wherein the second layer comprises one or more memory accessible instance nodes each arranged to represent a word or an entity of the natural language dataset and, wherein each of the one or more instance nodes are linked by one or more semantic or syntactic relations to form one or more sub-graphs;
- referencing the first layer of the multi-layer knowledge network with the second layer of the multi-layer knowledge network to form an accessible natural language referencing dataset arranged to be accessed for comparison during the processing of a natural language input by establishing a direct memory reference between each of the word nodes and each of the instance nodes when upon it is determined that the word or the entity name represented by each word node is associated with the word or the entity represented by the instance node such that each of the plurality of word nodes is directly linked to at least one of the one or more sub-graphs through an associated instance node; and
- generating a third layer of the multi-layer knowledge network as a third data structure in computing storage comprising one or more graph based probabilistic rules, wherein the one or more graph based probabilistic rules include a condition pattern, wherein the one or more graph based probabilistic rules further include a result pattern;
- a module arranged to compare a condition pattern of each of the one or more graph based probabilistic rules with the co-referenced dependency graph to identify one or more matching sub-graphs in the co-referenced dependency graph when the one or more sub-graphs are matched to the condition pattern;
- a comparator module arranged to compare the connected sub-graph to the matching sub-graph to a result pattern of the matched graph based probabilistic rule; and,
- reporting one or more conflicts if one or more sub-graph of the co-referenced dependency graph does match to any condition pattern of the one or more probabilistic rules or the connected sub-graph to the matching sub-graph does not satisfied the result pattern of the matched graph based probabilistic rule.

* * * * *